(12) United States Patent
Tanaka et al.

(10) Patent No.: US 11,973,437 B2
(45) Date of Patent: Apr. 30, 2024

(54) POWER CONVERSION DEVICE

(71) Applicant: Mitsubishi Electric Corporation, Tokyo (JP)

(72) Inventors: Miwako Tanaka, Tokyo (JP); Takushi Jimichi, Tokyo (JP); Akito Nakayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 167 days.

(21) Appl. No.: 17/792,712

(22) PCT Filed: Mar. 30, 2020

(86) PCT No.: PCT/JP2020/014532
§ 371 (c)(1),
(2) Date: Jul. 14, 2022

(87) PCT Pub. No.: WO2021/199150
PCT Pub. Date: Oct. 7, 2021

(65) Prior Publication Data
US 2023/0049159 A1    Feb. 16, 2023

(51) Int. Cl.
*H02M 7/537*    (2006.01)
*H02M 1/00*    (2006.01)
(Continued)

(52) U.S. Cl.
CPC ......... *H02M 7/537* (2013.01); *H02M 1/0003* (2021.05); *H02M 1/0025* (2021.05);
(Continued)

(58) Field of Classification Search
CPC ... H02M 7/4835; H02M 7/537; H02M 1/0003
See application file for complete search history.

(56) References Cited

U.S. PATENT DOCUMENTS

| 10,530,275 B2* | 1/2020 | Vasiladiotis | ...... H02M 7/53876 |
| 2014/0003101 A1* | 1/2014 | Tang | .................. H02M 7/4835 363/40 |

(Continued)

FOREIGN PATENT DOCUMENTS

| JP | 2002-58256 A | 2/2002 |
| JP | 2018-196237 A | 12/2018 |

(Continued)

OTHER PUBLICATIONS

International Search Report and Written Opinion dated Jul. 7, 2020, received for PCT Application PCT/JP2020/014532, filed on Mar. 30, 2020, 8 pages including English Translation.

(Continued)

*Primary Examiner* — Jue Zhang
(74) *Attorney, Agent, or Firm* — XSENSUS LLP

(57) ABSTRACT

A power conversion device includes, for respective phases of an AC circuit, leg circuits each having a pair of arms connected in series to each other, each arm including a plurality of converter cells which are connected in series and each of which has an energy storage element. A controlling circuitry includes a zero-phase-sequence voltage command value adjustment unit for correcting arm voltage command values for the arms by a zero-phase-sequence voltage command value. The command value correction circuitry performs adjustment control for adjusting the zero-phase-sequence voltage command value so that at least one arm (Continued)

voltage command value becomes equivalent to a limit value of the output voltage range of the arm.

20 Claims, 18 Drawing Sheets

(51) Int. Cl.
*H02M 7/483* (2007.01)
*H02M 7/5387* (2007.01)
*H02M 7/797* (2006.01)

(52) U.S. Cl.
CPC ..... *H02M 7/4835* (2021.05); *H02M 7/53873* (2013.01); *H02M 7/797* (2013.01)

(56) References Cited

U.S. PATENT DOCUMENTS

| | | | |
|---|---|---|---|
| 2015/0207434 A1* | 7/2015 | Wang | H02M 7/4835 363/78 |
| 2016/0079883 A9* | 3/2016 | Geyer | H02M 7/4835 363/71 |
| 2016/0211792 A1 | 7/2016 | Yamakawa et al. | |
| 2017/0047860 A1 | 2/2017 | Fujii et al. | |
| 2019/0044427 A1 | 2/2019 | Fujii et al. | |
| 2021/0376758 A1* | 12/2021 | Ying | H02M 7/4833 |

FOREIGN PATENT DOCUMENTS

| | | |
|---|---|---|
| WO | 2015/025437 A1 | 2/2015 |
| WO | 2015/178376 A1 | 11/2015 |
| WO | 2017/046908 A1 | 3/2017 |

OTHER PUBLICATIONS

Notice of Reasons for Refusal dated Sep. 29, 2020, received for JP Application 2020-545201, 5 pages Including English Translation.

Extended European search report dated Apr. 5, 2023 in European Patent Application No. 20929602.9, 8 pages.

S. D'Arco, et al., "Interoperability of Modular Multilevel Converters and 2-level Voltage Source Converters in a Laboratory-Scale Multi-Terminal DC Grid," 2018 International Power Electronics Conference (IPEC-Niigata 2018—ECCE Asia), Niigata, Japan, IEEJ Industry Application Society, May 20, 2018, pp. 2003-2010, doi: 10.23919/IPEC.2018.8507979.

R. Picas, et al., "Improving Capacitor Voltage Ripples and Power Losses of Modular Multilevel Converters through Discontinuous Modulation," IECON 2013—39th Annual Conference of the IEEE Industrial Electronics Society, Vienna, Austria, IEEE, Nov. 10, 2013, pp. 6233-6238, doi: 10.1109/IECON.2013.6700160.

* cited by examiner

POWER CONVERSION DEVICE

CROSS-REFERENCE TO RELATED APPLICATION

The present application is based on PCT filing PCT/JP2020/014532, filed Mar. 30, 2020, the entire contents of which is incorporated herein by reference.

TECHNICAL FIELD

The present disclosure relates to a power conversion device.

BACKGROUND ART

In recent years, in power conversion devices used for high-voltage application such as a power grid, a multilevel converter in which a plurality of converter cells each including a semiconductor switching element are connected in series in a multiplexed manner, has been put into practice. Such a converter is called a modular multilevel converter (MMC) type, a cascaded multilevel converter (CMC) type, or the like, and is used for conversion from three-phase AC to DC or conversion opposite thereto. Since the size of the multilevel converter is very large, size reduction of each converter cell is required and enhancement of power conversion efficiency is also required.

Meanwhile, in a power conversion device that converts multiphase AC using a general inverter/converter not having a configuration in which a plurality of converter cells are connected in series in a multiplexed manner as described above, in order to increase the voltage usage ratio so as to enhance the efficiency and reduce the capacitances of capacitors so as to achieve size reduction, the following control is disclosed.

That is, a power conversion device as a conventional electric motor control device includes generation means for generating a modulation signal by adding a third-order harmonic signal to a phase voltage command signal, and adjustment means for adjusting the amplitude of the third-order harmonic signal, and the adjustment means controls the amplitude of the third-order harmonic signal so that the peak value of the voltage between terminals of a smoothing capacitor when the amplitude of the third-order harmonic signal is adjusted becomes smaller than the peak value of the voltage between the terminals when the amplitude of the third-order harmonic signal is not adjusted (see, for example, Patent Document 1).

In the power conversion device described in Patent Document 1, ripple of the voltage between the terminals of the capacitor is suppressed, whereby the voltage usage ratio is improved and the efficiency is enhanced, and also, the capacitance of the capacitor is reduced and size reduction is achieved. However, in a multilevel converter in which a plurality of converter cells each including a DC capacitor are connected in series in a multiplexed manner, if the capacitances of the capacitors are reduced, voltage variation in each capacitor increases. Therefore, in a case where the control method described in Patent Document 1 is applied to the multilevel converter, a voltage command value sometimes becomes greater than the sum value (the range of voltage that the converter can output) of capacitor voltages in the arm for each phase of AC, so that voltage cannot be outputted. As a result, operation stability of the power conversion device cannot be ensured, thus having a problem that there is a case where power conversion efficiency cannot be enhanced.

CITATION LIST

Patent Document

Patent Document 1: WO2015/025437

SUMMARY OF THE INVENTION

Problems to be Solved by the Invention

The present disclosure has been made to solve the above problem, and an object of the present disclosure is to provide a power conversion device in which operation stability is ensured and the efficiency is enhanced.

Solution to the Problems

A power conversion device according to the present disclosure includes: a power converter including, for respective phases of AC, leg circuits each including a pair of arms connected in series to each other, the arms each including a plurality of converter cells which are connected in series and each of which has an energy storage element and a plurality of semiconductor elements, the leg circuits being connected in parallel between positive and negative DC terminals, the power converter being configured to perform power conversion between AC and DC; and a control unit for controlling the power converter. The control unit includes a command value correction unit which corrects an arm voltage command value for each arm for controlling outputs of the converter cells in the arm, by a zero-phase-sequence voltage command value. The command value correction unit performs adjustment control for adjusting the zero-phase-sequence voltage command value so that at least one of the arm voltage command values becomes equivalent to a limit value of an output voltage range of the arm.

Effect of the Invention

The power conversion device according to the present disclosure makes it possible to obtain a power conversion device in which operation stability is ensured and the efficiency is enhanced.

DESCRIPTION OF EMBODIMENTS

Embodiment 1

Figure 1:
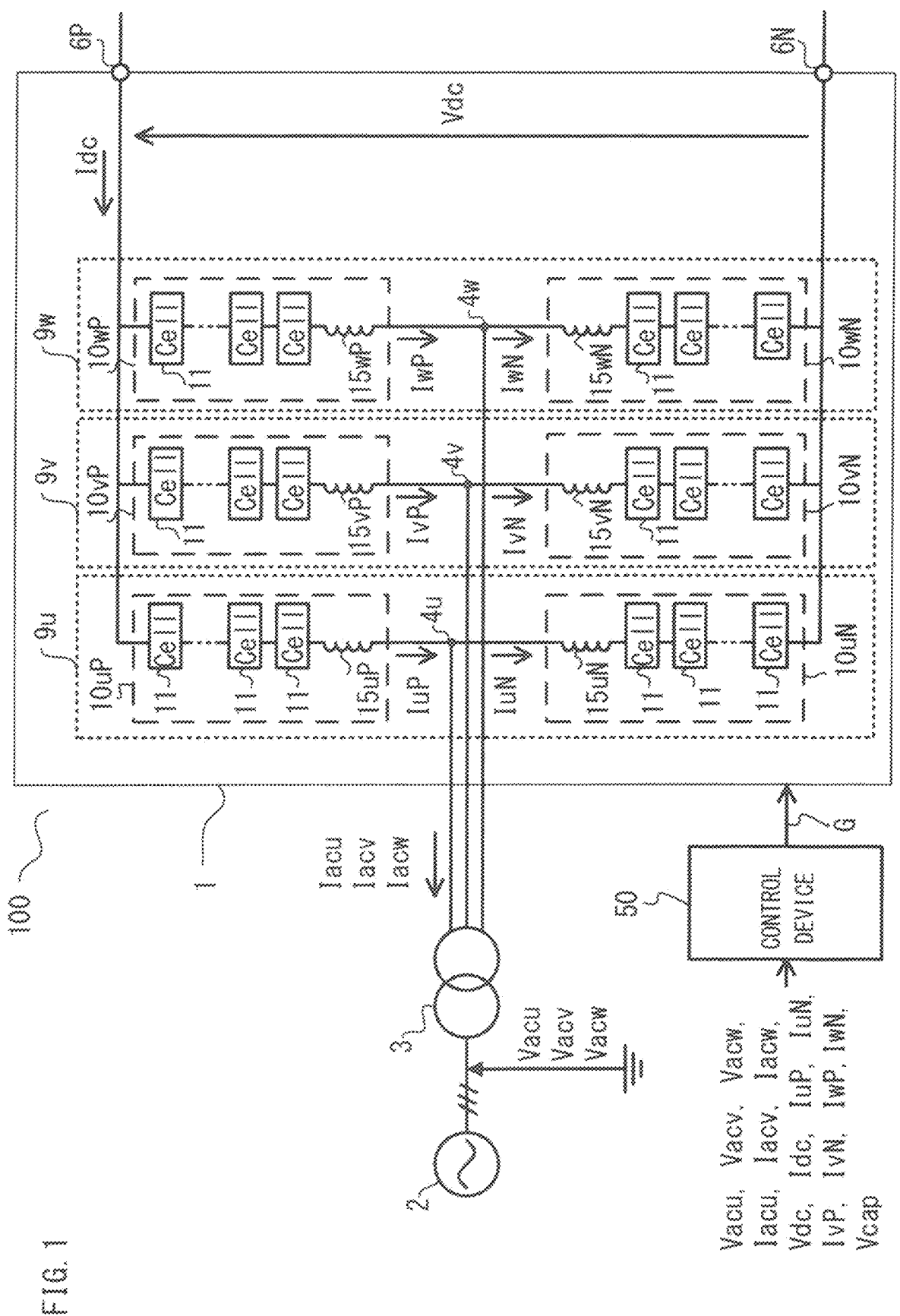
FIG. 1 shows a schematic configuration of an example of a power grid to which a power conversion device according to embodiment 1 is applied.

FIG. 1 shows a schematic configuration of an example of a power grid to which a power conversion device 100 according to embodiment 1 is applied.

As shown in FIG. 1, the power conversion device 100 includes a power converter 1 which is a main circuit, and a control device 50 as a control unit for controlling the power converter 1.

The power converter 1 performs power conversion between AC and DC. The AC side thereof is connected to an AC power supply 2 which is a three-phase AC grid as multiphase AC via a transformer 3. The DC side of the power converter 1 is connected to a DC power transmission network, a power conversion device that outputs DC power, or the like (not shown) via a positive-side DC terminal 6P and a negative-side DC terminal 6N.

The power converter 1 includes three leg circuits 9u, 9v, 9w provided respectively for u phase, v phase, and w phase of three-phase AC and connected in parallel between the positive-side DC terminal 6P and the negative-side DC terminal 6N.

The leg circuit 9u includes a positive-side arm 10uP and a negative-side arm 10uN as a pair of arms, and the positive-side arm 10uP and the negative-side arm 10uN are connected in series to each other.

One end of the positive-side arm 10uP is connected to the positive-side DC terminal 6P, and one end of the negative-side arm 10uN is connected to the negative-side DC terminal 6N. A connection point 4u between the positive-side arm 10uP and the negative-side arm 10uN is connected to a u-phase terminal of the transformer 3.

The leg circuit 9v includes a positive-side arm 10vP and a negative-side arm 10vN as a pair of arms, and the positive-side arm 10vP and the negative-side arm 10vN are connected in series to each other.

One end of the positive-side arm 10vP is connected to the positive-side DC terminal 6P, and one end of the negative-side arm 10vN is connected to the negative-side DC terminal 6N. A connection point 4v between the positive-side arm 10vP and the negative-side arm 10vN is connected to a v phase terminal of the transformer 3.

The leg circuit 9w includes a positive-side arm 10wP and a negative-side arm 10wN as a pair of arms, and the positive-side arm 10wP and the negative-side arm 10wN are connected in series to each other.

One end of the positive-side arm 10wP is connected to the positive-side DC terminal 6P, and one end of the negative-side arm 10wN is connected to the negative-side DC terminal 6N. A connection point 4w between the positive-side arm 10wP and the negative-side arm 10wN is connected to a w phase terminal of the transformer 3.

Hereinafter, a configuration of each leg circuit 9u, 9v, 9w will be described.

The leg circuits 9v, 9w for v phase and w phase have the same configuration as the leg circuit 9u for u phase. Therefore, the leg circuit 9u for u phase will be described as a representative.

The positive-side arm 10uP of the leg circuit 9u includes a plurality of converter cells 11 connected in series and a reactor 15uP, and the plurality of converter cells 11 and the reactor 15uP are connected in series to each other.

Similarly, the negative-side arm 10uN of the leg circuit 9u includes a plurality of converter cells 11 connected in series and a reactor 15uN, and the converter cells 11 and the reactor 15uN are connected in series to each other.

The reactor 15uP may be provided at any position within the positive-side arm 10uP, and similarly, the reactor 15uN may be provided at any position within the negative-side arm 10uN. The inductance values of the reactors 15uP, 15uN may be different from each other and may be coupled with reactors for another phase. A configuration in which the reactor 15uP is provided only in the positive-side arm 10uP may be adopted, or a configuration in which the reactor 15uN is provided only in the negative-side arm 10uN may be adopted.

In the following description, when the positive-side arms 10uP, 10vP, 10wP and the negative-side arms 10uN, 10vN, 10wN need not be discriminated from each other, they are referred to as arms 10, or positive-side arms 10P and negative-side arms 10N.

Hereinafter, a configuration of each converter cell 11 composing the leg circuits 9u, 9v, 9w will be described.

Figure 2:
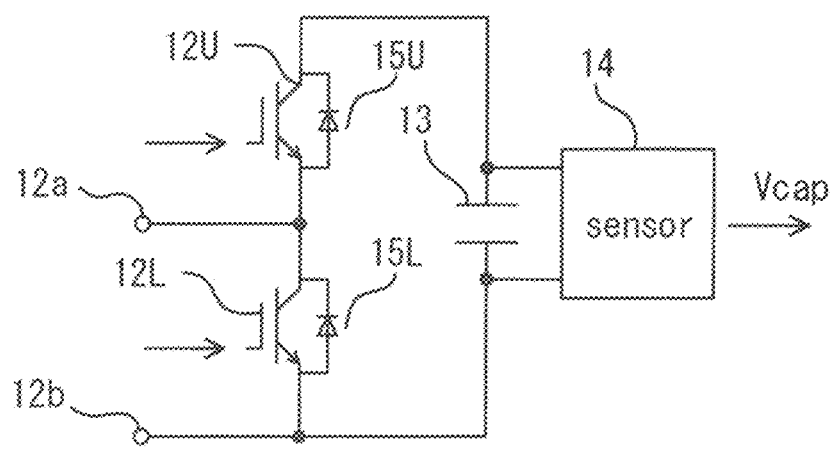
FIG. 2 is a circuit diagram showing an example of a configuration of a converter cell of a half-bridge type according to embodiment 1.

FIG. 2 is a circuit diagram showing an example of a configuration of the converter cell 11 of a half-bridge type according to embodiment 1.

Figure 3:
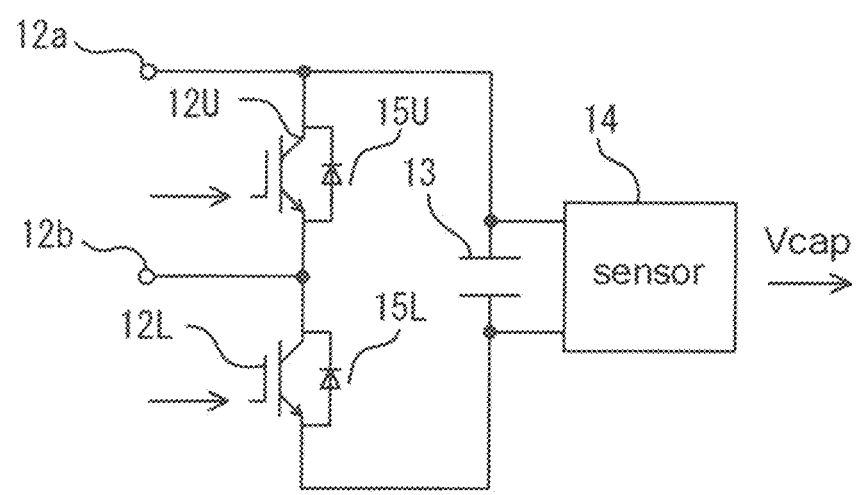
FIG. 3 is a circuit diagram showing an example of a configuration of a converter cell of a half-bridge type according to embodiment 1.

FIG. 3 is a circuit diagram showing the converter cell 11 of a half-bridge type having a configuration different from that in FIG. 2, according to embodiment 1.

Figure 4:
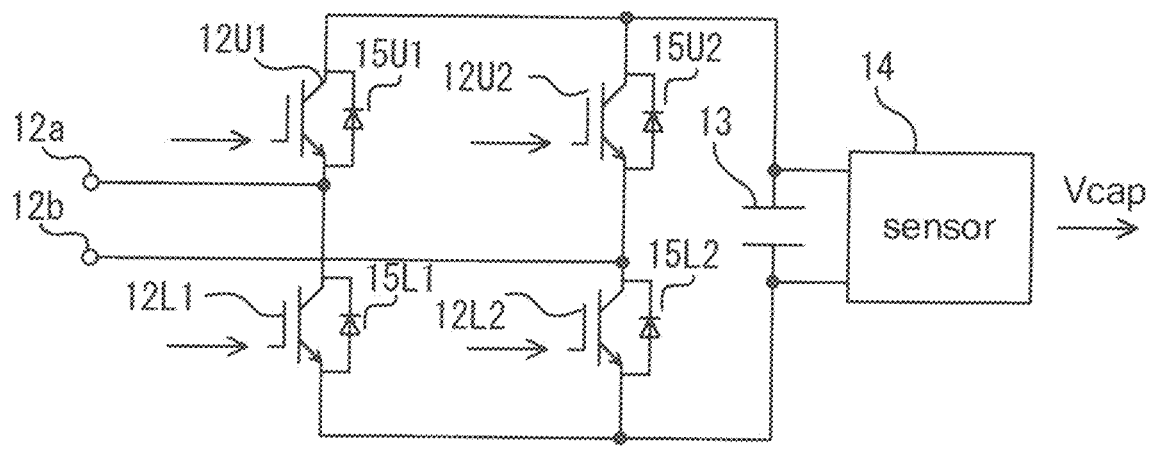
FIG. 4 is a circuit diagram showing an example of a configuration of a converter cell of a full-bridge type according to embodiment 1.

FIG. 4 is a circuit diagram showing a configuration example of the converter cell 11 of a full-bridge type according to embodiment 1.

For the converter cell 11, any of the circuit configurations shown in FIG. 2 to FIG. 4 may be used, and the circuit configurations may be used in combination in the positive-side arm 10uP and the negative-side arm 10uN.

The converter cell 11 shown in FIG. 2 includes a series unit of semiconductor switching elements 12 (12U, 12L) as semiconductor elements connected in series to each other, a DC capacitor 13 as an energy storage element which is connected in parallel to the series unit and smooths DC voltage, and a voltage sensor 14 for detecting DC capacitor voltage Vcap of the DC capacitor 13. In addition, diode elements 15U, 15L are connected in antiparallel (parallel and reverse bias direction) to the semiconductor switching elements 12U, 12L, respectively.

A connection node between the semiconductor switching elements 12U and 12L is connected to an input/output terminal 12a on the positive side, and a connection node between the semiconductor switching element 12L and the DC capacitor 13 is connected to an input/output terminal 12b on the negative side.

In the converter cell 11 having the configuration shown in FIG. 2, the semiconductor switching elements 12U, 12L are controlled so that one of them is turned on and the other is turned off. When the semiconductor switching element 12U is on and the semiconductor switching element 12L is off, voltage across the DC capacitor 13 is applied between the input/output terminals 12a and 12b. Positive-side voltage is applied on the input/output terminal 12a side and negative-side voltage is applied on the 12b side.

The converter cell 11 shown in FIG. 3 includes a series unit of semiconductor switching elements 12U, 12L as semiconductor elements connected in series to each other, a DC capacitor 13 as an energy storage element which is connected in parallel to the series unit and smooths DC voltage, and a voltage sensor 14 for detecting DC capacitor voltage Vcap of the DC capacitor 13. A connection point between the semiconductor switching elements 12U and 12L is connected to an input/output terminal 12b on the negative side, and a connection point between the semiconductor switching element 12U and the DC capacitor 13 is connected to an input/output terminal 12a on the positive side.

In the converter cell 11 having the configuration shown in FIG. 3, the semiconductor switching elements 12U, 12L are controlled so that one of them is turned on and the other is turned off. When the semiconductor switching element 12U is off and the semiconductor switching element 12L is on, voltage across the DC capacitor 13 is applied between the input/output terminals 12a and 12b. Positive-side voltage is applied on the input/output terminal 12a side and negative-side voltage is applied on the 12b side. In addition, diode elements 15U, 15L are connected in antiparallel (parallel and reverse bias direction) to the semiconductor switching elements 12U, 12L, respectively.

The converter cell 11 having the configuration shown in FIG. 4 includes a series unit of semiconductor switching elements 12U1, 12L1 as semiconductor elements connected in series to each other, a series unit of semiconductor switching elements 12U2, 12L2 as semiconductor elements which are also connected in series to each other, a DC capacitor 13 as an energy storage element, and a voltage sensor 14 for detecting DC capacitor voltage Vcap of the DC capacitor 13. The series unit of the semiconductor switching elements 12U1, 12L1, the series unit of the semiconductor switching elements 12U2, 12L2, and the DC capacitor 13 are connected in parallel.

In addition, diode elements 15U1, 15L1 are connected in antiparallel (parallel and reverse bias direction) to the semiconductor switching elements 12U1, 12L1, respectively. In addition, diode elements 15U2, 15L2 are connected in antiparallel (parallel and reverse bias direction) to the semiconductor switching elements 12U2, 12L2, respectively.

In the converter cell 11 having the configuration shown in FIG. 4, the semiconductor switching elements 12U1, 12L1 are controlled so that one of them is turned on and the other is turned off. Similarly, the semiconductor switching elements 12U2, 12L2 are controlled so that one of them is turned on and the other is turned off. When the semiconductor switching element 12U1 is on and the semiconductor switching element 12L1 is off, and when the semiconductor switching element 12U2 is off and the semiconductor switching element 12L2 is on, voltage across the DC capacitor 13 is applied between the input/output terminals 12a and 12b. Positive-side voltage is applied on the input/output terminal 12a side, and negative-side voltage is applied on the 12b side.

Further, the power conversion device 100 includes, in addition to each voltage sensor 14 for detecting the DC capacitor voltage value Vcap, a plurality of detectors for detecting voltages and currents of the power converter 1.

As shown in FIG. 1, the control device 50 receives phase voltages Vacu, Vacv, Vacw at the AC end of the power converter 1, currents Iacu, Iacv, Iacw at the AC end, DC voltage Vdc between the positive-side DC terminal 6P and the negative-side DC terminal 6N, DC current Idc flowing through the positive-side DC terminal 6P or the negative-side DC terminal 6N, currents IuP, IvP, IwP flowing through the positive-side arms 10uP, 10vP, 10wP, currents IuN, IvN, IwN flowing through the negative-side arms 10uN, 10vN, 10wN, and the DC capacitor voltage Vcap of each DC capacitor 13, which are detected by the above detectors.

Hereinafter, the configuration of the control device 50 will be described.

Figure 5:
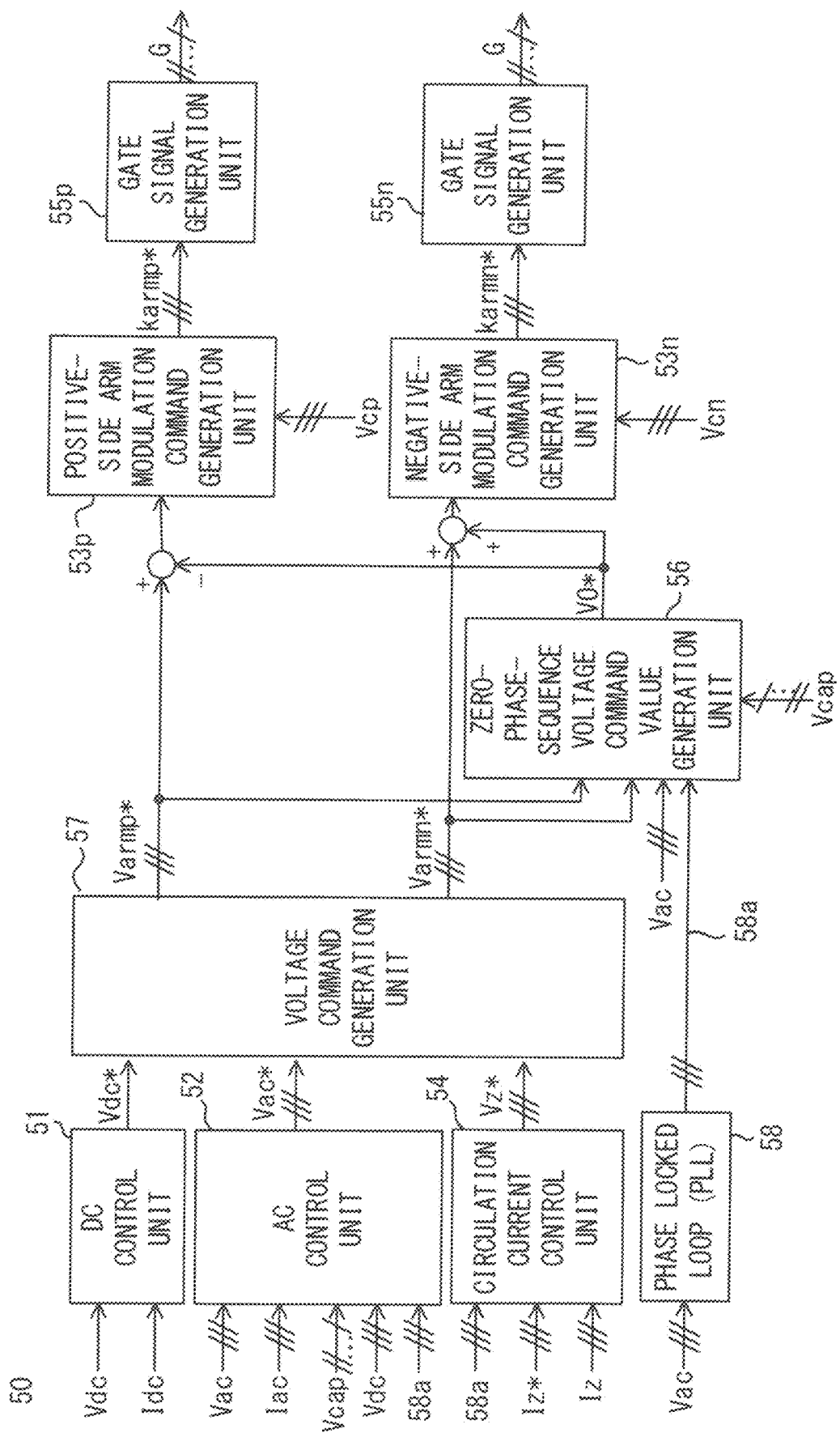
FIG. 5 is a block diagram showing a schematic configuration of a control device according to embodiment 1.

FIG. 5 is a block diagram showing a schematic configuration of the control device 50 according to embodiment 1.

The control device 50 may be formed by a dedicated circuit, or a part or the entirety thereof may be formed by at least either a field programmable gate array (FPGA) or a microprocessor.

Hereinafter, with reference to FIG. 5, the configuration of the control device 50 and the outline of operation of each component will be described.

The control device 50 generates gate signals G for driving the semiconductor switching elements 12 in the converter cells 11 of the power converter 1 on the basis of detection values detected by the detectors.

As shown in FIG. 5, the control device 50 includes a DC control unit 51, an AC control unit 52, a positive-side arm modulation command generation unit 53p, a negative-side arm modulation command generation unit 53n, a circulation current control unit 54, gate signal generation units 55p, 55n, a zero-phase-sequence voltage command value generation unit 56, a voltage command generation unit 57, and a phase locked loop 58.

The phase locked loop 58 generates and outputs a phase signal 58a indicating a fundamental phase $\theta$ (=$\omega$t) synchronized with the phase of the AC voltage Vac.

The DC control unit 51 receives the DC voltage Vdc between the positive-side DC terminal 6P and the negative-side DC terminal 6N of the power converter 1, and the DC current Idc flowing through the positive-side DC terminal 6P or the negative-side DC terminal 6N. The DC control unit 51 generates a DC voltage command value Vdc* on the basis of the received DC voltage Vdc and DC current Idc. The generated DC voltage command value Vdc* is inputted to the voltage command generation unit 57.

Here, the DC voltage command value Vdc* represents a DC voltage component that all the converter cells 11 included in the positive-side arms 10P and all the converter cells 11 included in the negative-side arms 10N should output.

The AC control unit 52 receives the phase voltages Vacu, Vacv, Vacw (which may be collectively referred to as AC voltages Vac) at the AC end of the power converter 1, the currents Iacu, Iacv, Iacw (which may be collectively referred to as AC currents Iac) at the AC end, the DC capacitor voltage Vcap, the DC voltage Vdc between the positive-side DC terminal 6P and the negative-side DC terminal 6N, and the phase signal 58a outputted from the phase locked loop 58.

On the basis of the received AC voltage Vac, AC current Iac, and phase signal 58a, the AC control unit 52 generates AC voltage command values Vacu*, Vacv*, Vacw* (which may be collectively referred to as AC voltage command values Vac*) for controlling AC voltages for u phase, v phase, w phase, respectively. The AC voltage command values Vac* represent AC voltage components that all the converter cells 11 included in the positive-side arm 10P and all the converter cells 11 included in the negative-side arm 10N should output.

The circulation current control unit 54 receives the phase signal 58a, a circulation current command value Iz* for balancing, among the arms 10, the DC capacitor voltages Vcap of the DC capacitors 13 included in the arms 10, and circulation current Iz. Here, the circulation current Iz represents current flowing among the respective legs 9u, 9v, 9w without flowing to the AC end and the DC end, in the power converter 1.

On the basis of the phase signal 58a indicating the fundamental phase θ synchronized with the phase of the AC voltage Vac, the circulation current control unit 54 outputs a voltage command value Vz* for circulation current control in control for causing the circulation current Iz to follow the circulation current command value Iz*. The outputted voltage command value Vz* for circulation current control is inputted to the voltage command generation unit 57.

The voltage command generation unit 57 combines the DC voltage command value Vdc* outputted from the DC control unit 51, the AC voltage command value Vac* outputted from the AC control unit 52, and the voltage command value Vz* for circulation current control outputted from the circulation current control unit 54, and generates and outputs positive-side arm voltage command values Varmp* (Varmpu*, Varmpv*, Varmpw*) for the positive-side arms 10P and the negative-side arm voltage command values Varmn* (Varmnu, Varmnv, Varmnw) for the negative-side arms 10N.

When the positive-side arm voltage command value Varmp* and the negative-side arm voltage command value Varmn* need not be discriminated from each other, they are referred to as arm voltage command values Varm*.

The positive-side arm voltage command value Varmp* and the negative-side arm voltage command value Varmn* outputted from the voltage command generation unit 57 are corrected by being combined with the zero-phase-sequence voltage command value Vo* outputted from the zero-phase-sequence voltage command value generation unit 56 as a command value correction unit, and the resultant values are respectively inputted to the positive-side arm modulation command generation unit 53p and the negative-side arm modulation command generation unit 53n.

The details of the zero-phase-sequence voltage command value generation unit 56 and the zero-phase-sequence voltage command value Vo* will be described later.

The positive-side arm modulation command generation unit 53p divides the corrected positive-side arm voltage command value Varmp* in which the positive-side arm voltage command value Varmp* and the zero-phase-sequence voltage command value Vo* are combined, by the value Vcp corresponding to the sum of the voltage values of the DC capacitors 13 included in the corresponding positive-side arm 10uP, 10vP, 10wP, and thus generates and outputs a positive-side modulation command karmp*.

Similarly, the negative-side arm modulation command generation unit 53n divides the corrected negative-side arm voltage command value Varmn* in which the negative-side arm voltage command value Varmn* and the zero-phase-sequence voltage command value Vo* are combined, by the value Vcn corresponding to the sum of the voltage values of the DC capacitors 13 included in the corresponding negative-side arm 10uN, 10vN, 10wN, and thus generates and outputs a negative-side modulation command karmn*.

When the positive-side modulation command karmp* and the negative-side modulation command karmn* need not be discriminated from each other, they are referred to as modulation commands karm*.

The generated modulation commands karmp*, karmpn* are respectively inputted to the gate signal generation units 55p, 55n.

In the gate signal generation units 55p, 55n, for example, a pulse width modulation (PWM) method in which the gate signals G are obtained through magnitude comparison between the inputted modulation command karm* and a carrier wave, is used. In the case where a plurality of converter cells 11 are connected in series as in a multilevel converter, a phase shift PWM method in which, in the arm 10, the phases of respective carrier waves are shifted by a value obtained by dividing 360 degrees by the number of the converter cells 11 included in the arm 10, is used.

With the gate signals G generated as described above, the converter cells 11 in the arms 10 of the power converter 1 are subjected to output control.

Although it is described that the gate signal generation units 55p, 55n are included in the control device 50, the gate signal generation units 55p, 55n may be included in the converter cells 11.

Next, the relationship between the arm voltage command value Varm* for the arm and limit values of the range of voltage that the arm can output, will be described.

As described above, the AC control unit 52 generates the AC voltage command value Vac* on the basis of the phase signal 58a outputted from the phase locked loop 58, the AC voltage Vac, and the AC current Iac.

In a case of u phase, for example, where the amplitude of the AC voltage Vac is denoted by Vp, the generated AC voltage command value Vac* is represented by the following (Expression 1), using the fundamental phase θ (=ωt) synchronized with the phase of the AC voltage Vac indicated by the phase signal 58a.

$$Vacu^* = Vp \times \sin \omega t \quad \text{(Expression 1)}$$

On the basis of the arm voltage command value Varm* generated using the AC voltage command value Vac* indicated by the above (Expression 1), the AC voltage Vac, and the phase signal 58a, the zero-phase-sequence voltage command value generation unit 56 generates and outputs the zero-phase-sequence voltage command value Vo* for adjusting the zero-phase-sequence voltage.

The generated zero-phase-sequence voltage command value Vo* has, as an example, a sinewave having an amplitude that is ⅙ of the amplitude Vp of the AC voltage command value Vacu* and having a frequency that is three times the phase θ (ωt), and is represented by the following (Expression 2).

$$Vo^* = Vp/6 \times \sin 3\omega t \quad \text{(Expression 2)}$$

As described above, the zero-phase-sequence voltage command value Vo* is combined with each arm voltage command value Varm* (positive-side arm voltage command value Vamp*, negative-side arm voltage command value Varmn*) outputted from the voltage command value generation unit 57, thereby correcting the arm voltage command value Varm*.

Here, the control device 50 of the present embodiment is configured to be switchable between a case of performing first control in which the zero-phase-sequence voltage command value Vo* is disabled and the modulation command karm* is generated by directly using the arm voltage command value Varm* outputted from the voltage command value generation unit 57 without correcting the arm voltage command value Varm* by the zero-phase-sequence voltage command value Vo*, and a case of performing second control in which the arm voltage command value Varm* outputted from the voltage command value generation unit 57 is corrected by being combined with the zero-phase-sequence voltage command value Vo* and the modulation command karm* is generated.

Hereinafter, the arm voltage command value Varm* will be described in each of the case of performing the first control in which the arm voltage command value Varm* is not corrected by the zero-phase-sequence voltage command value Vo* and the case of performing the second control in which the arm voltage command value Varm* is corrected by the zero-phase-sequence voltage command value Vo*.

Figure 6:
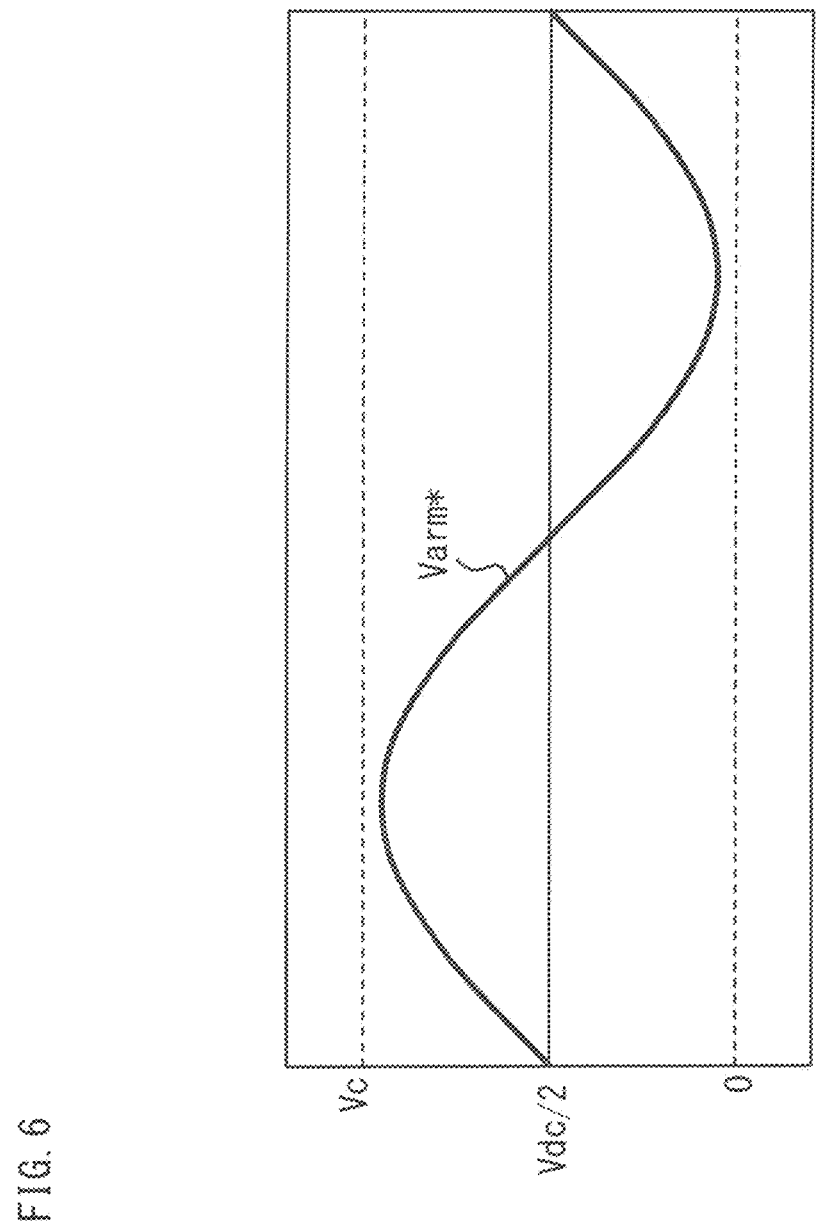
FIG. 6 is a waveform diagram showing an arm voltage command value in first control of the control device according to embodiment 1 and limit values of the range of voltage that an arm can output.

FIG. 6 is a waveform diagram showing the arm voltage command value Varm* and the limit values of the range of voltage that the arm 10 can output, in the case of performing the first control in which the arm voltage command value Varm* is not corrected by the zero-phase-sequence voltage command value Vo*, in the control device 50 according to embodiment 1.

In FIG. 6, Vc (capacitor voltage Vc) is a value that correctively refers to the value Vcp corresponding to the sum of the voltage values of the DC capacitors 13 included in the positive-side arm 10P and the value Vcn corresponding to the sum of the voltage values of the DC capacitors 13 included in the negative-side arm 10N, of the arms 10 for each phase, and is an upper limit value of the limit values of the range of voltage that the arm 10 can output. In FIG. 6, 0 is a lower limit value of the limit values of the range of voltage that the arm 10 can output.

FIG. 6 shows a case where the capacitor voltage Vc which is the sum of the DC capacitor voltages Vcap of all the DC capacitors in each arm 10 is constant, and the capacitor voltage Vc which is the sum of the DC capacitor voltages Vcap is equal to the DC voltage Vdc. In addition, an AC modulation factor kac is set at 0.4, and the voltage command value Vz* for circulation current control is approximately equal to 0.

Here, regarding the arm voltage command value Varm*, for example, the u-phase positive-side arm voltage command value Varmpu* generated by the voltage command generation unit 57 is represented by the following (Expression 3) using the AC voltage command value Vac*, the DC voltage command value Vdc*, and the circulation current command value Vz*, in the case of not being corrected by the zero-phase-sequence voltage command value Vo*.

$$Varmpu^* = -Vac^*/2 + Vdc^*/2 + Vz^* \quad \text{(Expression 3)}$$

The AC modulation factor kac is represented by the following (Expression 4).

$$kac = Vp \div (2 \times Vc) \quad \text{(Expression 4)}$$

When the AC modulation factor kac is 0.4 and the voltage command value Vz* for circulation current control is approximately equal to 0, the following (Expression 5) is obtained from the above (Expression 1), (Expression 3), and (Expression 4).

$$Varmpu^* = -0.4Vc \times \sin \omega t + Vc/2 \quad \text{(Expression 5)}$$

Thus, in this case, the u-phase positive-side arm voltage command value Varmpu* is in a range of 0.1Vc Varmpu*≤0.9Vc, that is, the u-phase positive-side arm voltage command value Varmpu* does not go outside of 0 and Vc which are the limit values of voltage that the arm 10 can output. Therefore, the corresponding arm 10uP for u phase on the positive side can output a value as indicated by the u-phase positive-side arm voltage command value Varmpu*, and can output AC voltage so as to follow the u-phase positive-side arm voltage command value Varmpu*.

Figure 7:
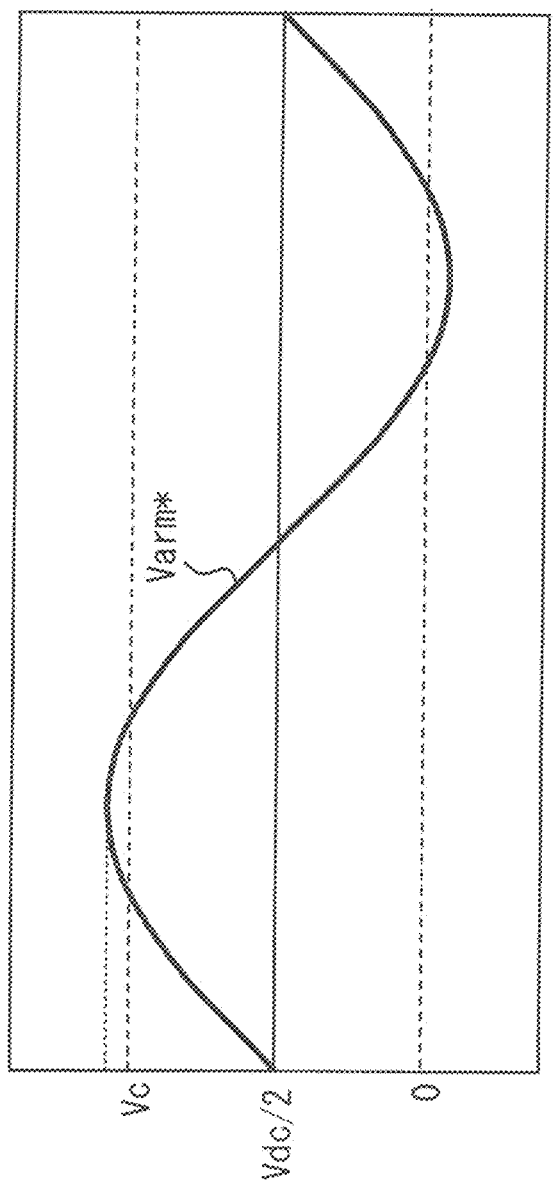
FIG. 7 is a waveform diagram showing the arm voltage command value in the first control of the control device according to embodiment 1 and the limit values of the range of voltage that the arm can output.

FIG. 7 is a waveform diagram showing the arm voltage command value Varm* and the limit values of voltage that the arm 10 can output, in the case of performing the first control in which the arm voltage command value Varm* is not corrected by the zero-phase-sequence voltage command value Vo*, as in FIG. 6.

As in FIG. 6, the sum Vc of the DC capacitor voltages Vcap of all the DC capacitors in each arm 10 is constant, and the AC modulation factor kac is greater than 0.5.

Here, regarding the u-phase positive-side arm voltage command value Varmpu* as an example, in a case where, for example, the AC modulation factor kac is 0.55, the circulation current control output Vz* is approximately equal to 0, and Vc is equal to Vdc, the following (Expression 6) is obtained from (Expression 1), (Expression 3), and (Expression 4).

$$Varmpu^* = -0.55Vc \times \sin \omega t + Vc/2 \quad \text{(Expression 6)}$$

In this case, Varmpu* is in a range of −0.05Vc Varmpu*≤1.05Vc, and as shown in FIG. 7, there is a part where the u-phase positive-side arm voltage command value Varmpu* becomes greater than the capacitor voltage Vc and there is also a part where the u-phase positive-side arm voltage command value Varmpu* becomes smaller than 0. The multilevel converter cannot output voltage smaller than 0 or greater than Vc, and as a result, the current waveform is distorted.

Figure 8:
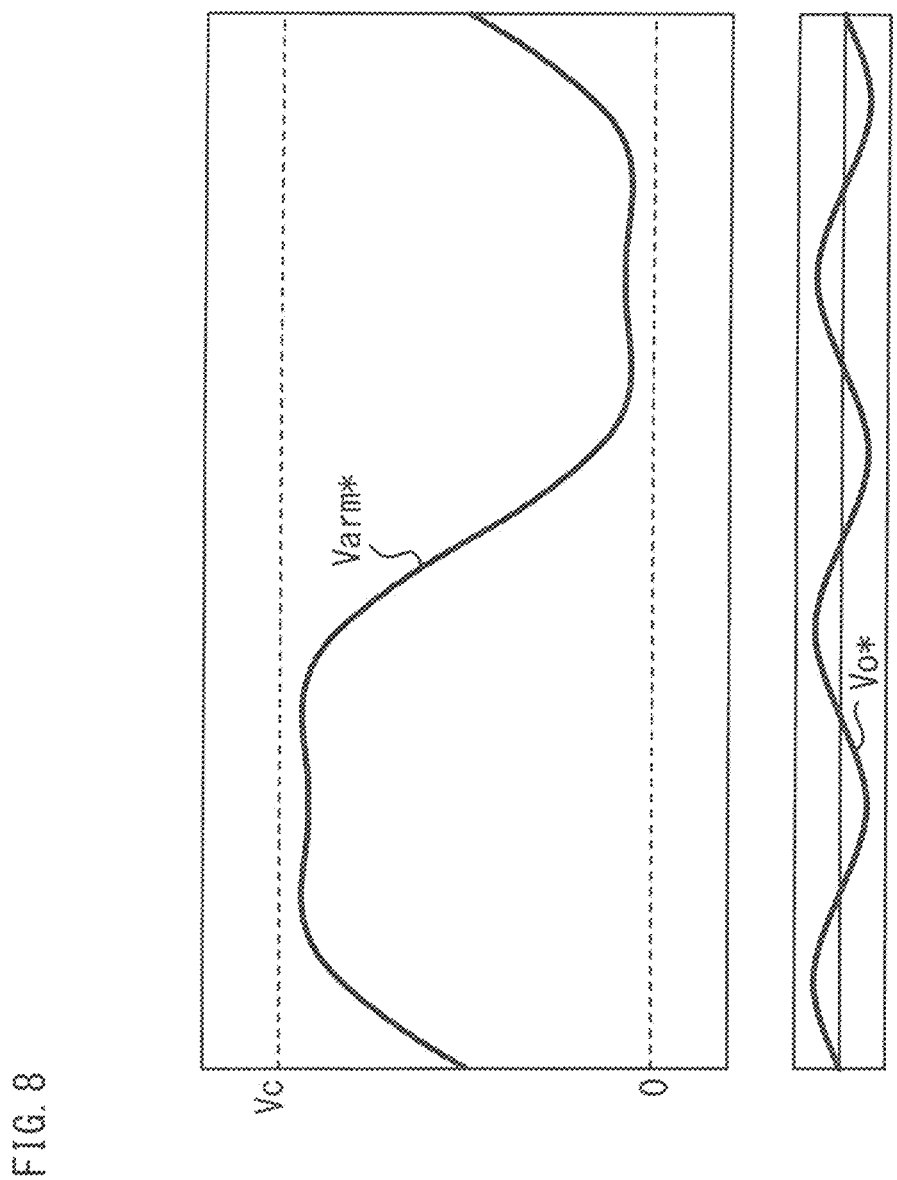
FIG. 8 is a waveform diagram showing the arm voltage command value when harmonic control is executed in second control of the control device according to embodiment 1, and the limit values of the range of voltage that the arm can output.

FIG. 8 is a waveform diagram showing the arm voltage command value Varm* and the limit values of the range of voltage that the arm can output, in a case of using the same arm voltage command value Varm* as in FIG. 6 and FIG. 7 and performing the second control in which the arm voltage command value Varm* is corrected by the zero-phase-sequence voltage command value Vo* represented by the above (Expression 2), in the control device 50 according to embodiment 1. In FIG. 8, the waveform of the zero-phase-sequence voltage command value Vo* is also shown.

As shown in FIG. 8, under the condition that the capacitor voltage Vc is constant, if the arm voltage command value Varm* is corrected by the zero-phase-sequence voltage command value Vo*, the arm voltage command value Varm* does not become greater than the capacitor voltage Vc and does not become smaller than 0. In this case, the arm voltage command value Varm* for each arm 10 is distorted at a frequency that is three times a fundamental frequency f of the AC voltage command value Vac*, but since the same common zero-phase-sequence voltage command value Vo* is given to all the three phases, the voltages outputted between the lines are equal and there is no influence on the AC end.

Thus, as described above, by giving the zero-phase-sequence voltage command value Vo* having a sinewave with a frequency that is three times the fundamental frequency f of the AC voltage command value Vac* as shown in (Expression 2), the corresponding arm 10 can output a value as indicated by the arm voltage command value Varm* without causing an influence on the AC grid side. That is, the required voltage value sum corresponding value Vc can be reduced and the DC capacitor 13 can be downsized.

However, in such a multilevel converter in which a plurality of converter cells each including a DC capacitor are connected in series in a multiplexed manner, voltage of each arm is not constant and voltage ripple occurs due to power pulsation.

For example, the positive-side arm voltage Varmp and current Iarmp of the multilevel converter are represented by the following (Expression 7) and (Expression 8).

$$Varmp = -Vp \times \sin(\omega t) + Vdc/2 - \omega(Lac+L/2)Ip \times \cos(\omega t) \quad \text{(Expression 7)}$$

$$Iarmp = -Ip/2 \times \sin(\omega t) + Idc/3 \quad \text{(Expression 8)}$$

Here, Vp is the amplitude of the AC voltage Vac, Vdc is the DC voltage, Lac is an AC inductance, L is an arm inductance, Ip is an AC current amplitude, Idc is the DC current, ω is an angular frequency synchronized with the AC grid voltage, and t is time.

From the above (Expression 7) and (Expression 8), instantaneous power of the positive-side arm of the multilevel converter is represented by the following (Expression 9).

$$Varmp * Iarmp = \quad \text{(Expression 9)}$$
$$Vp \times Ip/2 \times \sin^2(\omega t) - Vdc/2 \times Ip/2 \times \sin(\omega t) +$$
$$1/2 \times \omega \times (Lac + L/2)Ip^2 \times \cos(\omega t) \times \sin(\omega t) -$$
$$Vp \times Idc/3 \times \sin(\omega t) + Vdc/2 \times Idc/3 -$$
$$\omega(Lac + L/2) \times Ip \times Idc/3 \times \cos(\omega t)$$

When the above (Expression 9) is arranged on a frequency-component basis, instantaneous power of the positive-side arm 10P of the multilevel converter is represented by the following (Expression 10).

$$Varmp * Iarmp = -1/4 \times Vp \times Ip + 1/2 \times Vdc \times Idc/3 - \quad \text{(Expression 10)}$$
$$(1/4 \times Vdc \times Ip + Vp \times Idc/3) \times \sin(\omega t) -$$
$$\omega(Lac + L/2) \times Ip \times Idc/3 \times \cos(\omega t) -$$
$$1/4 \times Vp \times Ip \times \cos(2\omega t) +$$
$$1/4 \times \omega \times (Lac + L/2) \times Ip^2 \times \sin(2\omega t)$$

As shown in the above (Expression 10), the instantaneous power of the positive-side arm 10P of the multilevel converter has a DC component, an AC grid frequency component, and a frequency component that is two times the fundamental frequency f of the AC grid. Therefore, in the multilevel converter, pulsation occurs in the DC capacitor voltage Vcap of the arm 10. If the capacitance is reduced in order to downsize the DC capacitor 13 of the multilevel converter, pulsation of the DC capacitor voltage Vcap further increases.

Figure 9:
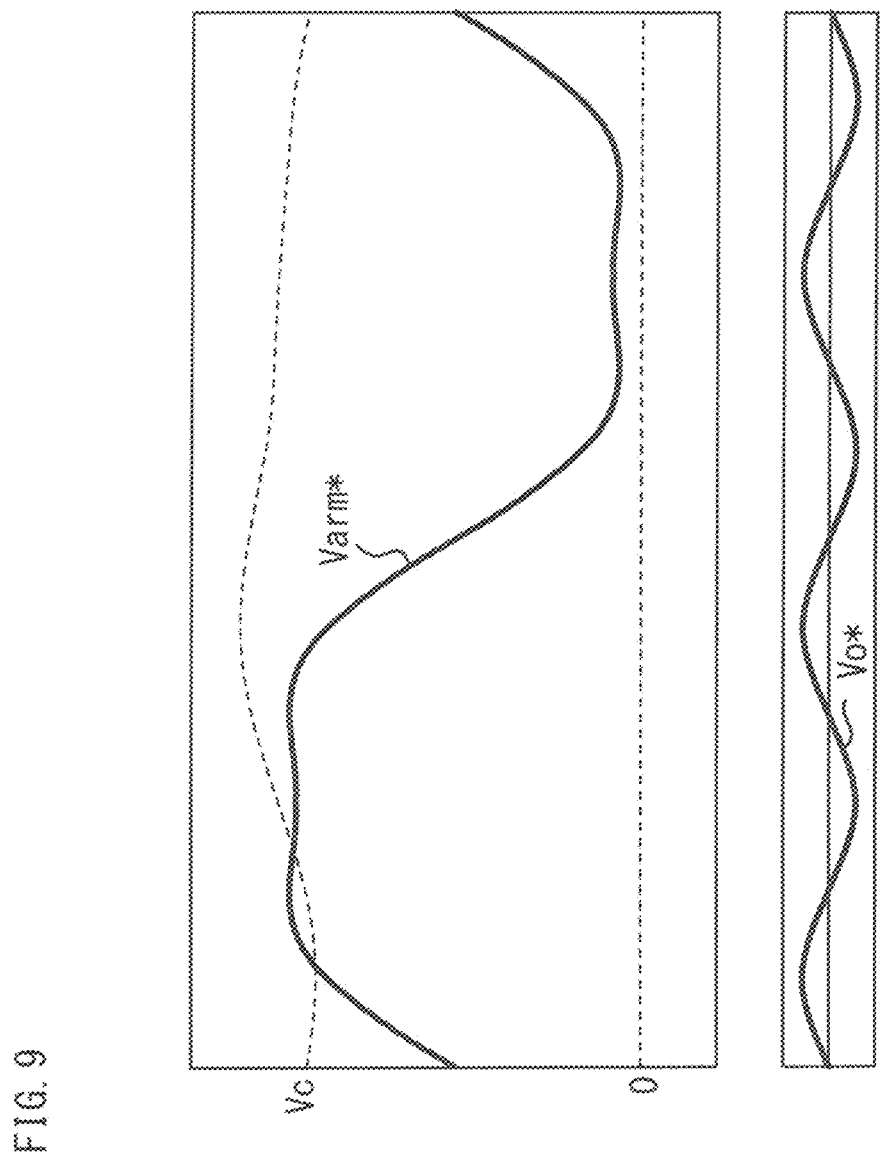
FIG. 9 is a waveform diagram showing the arm voltage command value when harmonic control is executed in the second control of the control device according to embodiment 1, and the limit values of the range of voltage that the arm can output.

FIG. 9 is a waveform diagram showing the arm voltage command value Varm* and the limit values of the range of voltage that the arm 10 can output, in a case where the same arm voltage command value Varm* and zero-phase-sequence voltage command value Vo* as in FIG. 8 are used and voltage pulsation occurs in the DC capacitor voltage Vcap (capacitor voltage Vc).

In this case, even though the arm voltage command value Varm* is corrected by the zero-phase-sequence voltage command value Vo* represented by the above (Expression 2), there is a part where the arm voltage command value Varm* becomes greater than the capacitor voltage Vc, due to the influence of voltage pulsation of the DC capacitor voltage Vcap. Therefore, the corresponding arm 10 cannot output a value as indicated by the arm voltage command value Varm*. If pulsation of the capacitor voltage Vc is great, voltage control allowance of each arm 10 differs.

Accordingly, in order to prevent the arm voltage command value Varm* from interfering with the limit values (Vc, 0) of the range of voltage that the arm 10 can output, the AC control unit 52 of the present embodiment performs the below-described control based on control allowance of the arm voltage command value Varm* with respect to the limit values Vc, 0 of the output voltage range.

Here, as described above, the power conversion device 100 is configured to be switchable between the first control in which the arm voltage command value Varm* is not corrected by the zero-phase-sequence voltage command value Vo* and the second control in which the arm voltage command value Varm* is corrected by the zero-phase-sequence voltage command value Vo*.

Further, the power conversion device 100 has, in the second control, control (hereinafter, referred to as harmonic control) using the zero-phase-sequence voltage command value Vo* having a sinewave with a frequency that is three times the AC voltage Vac as shown in the above (Expression 2), and control (hereinafter, referred to as adjustment control) using the zero-phase-sequence voltage command value Vo* based on control allowance of the arm voltage command value Varm* as described below.

Figure 10:
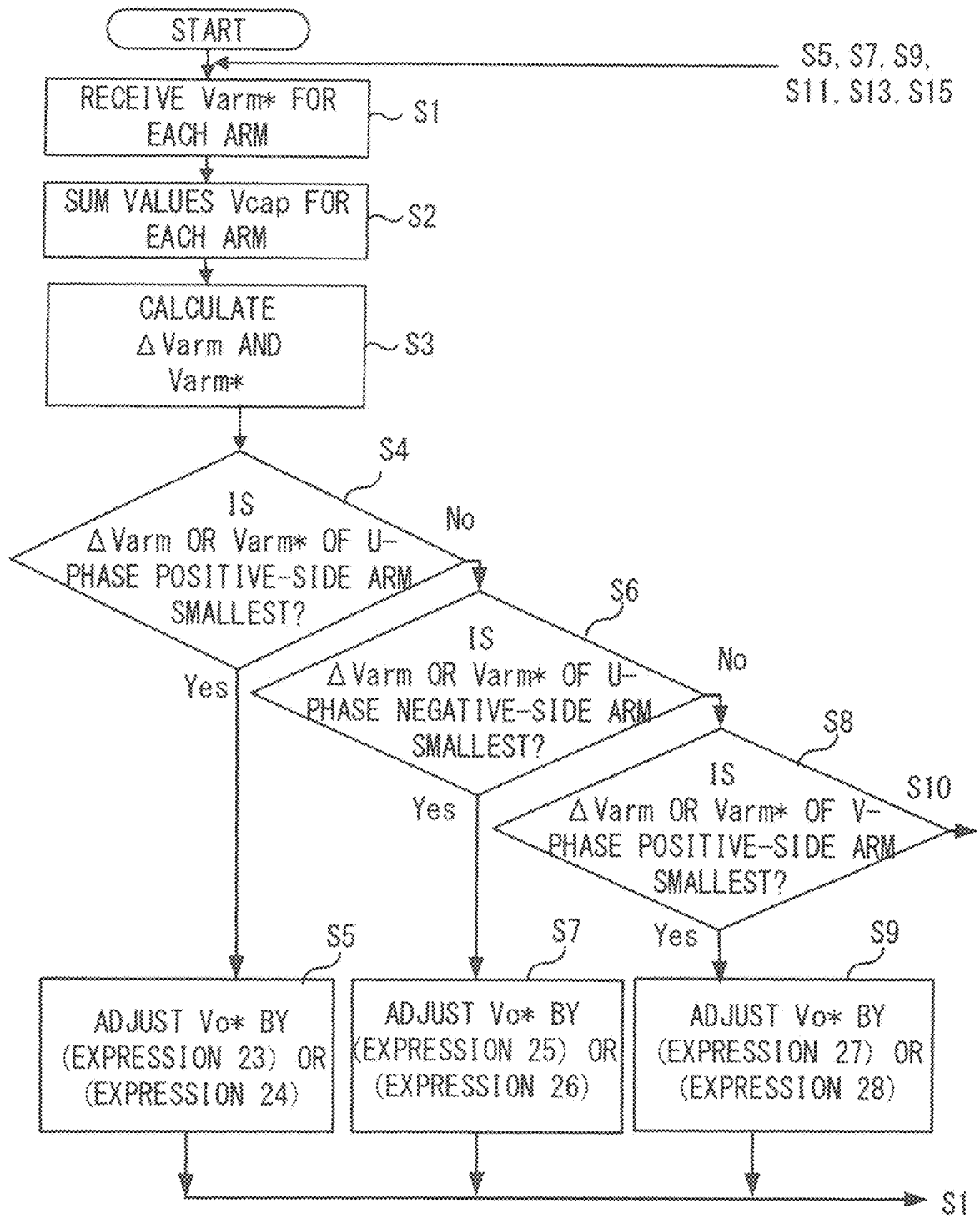
FIG. 10 is a control flowchart of the control device according to embodiment 1.
Figure 11:
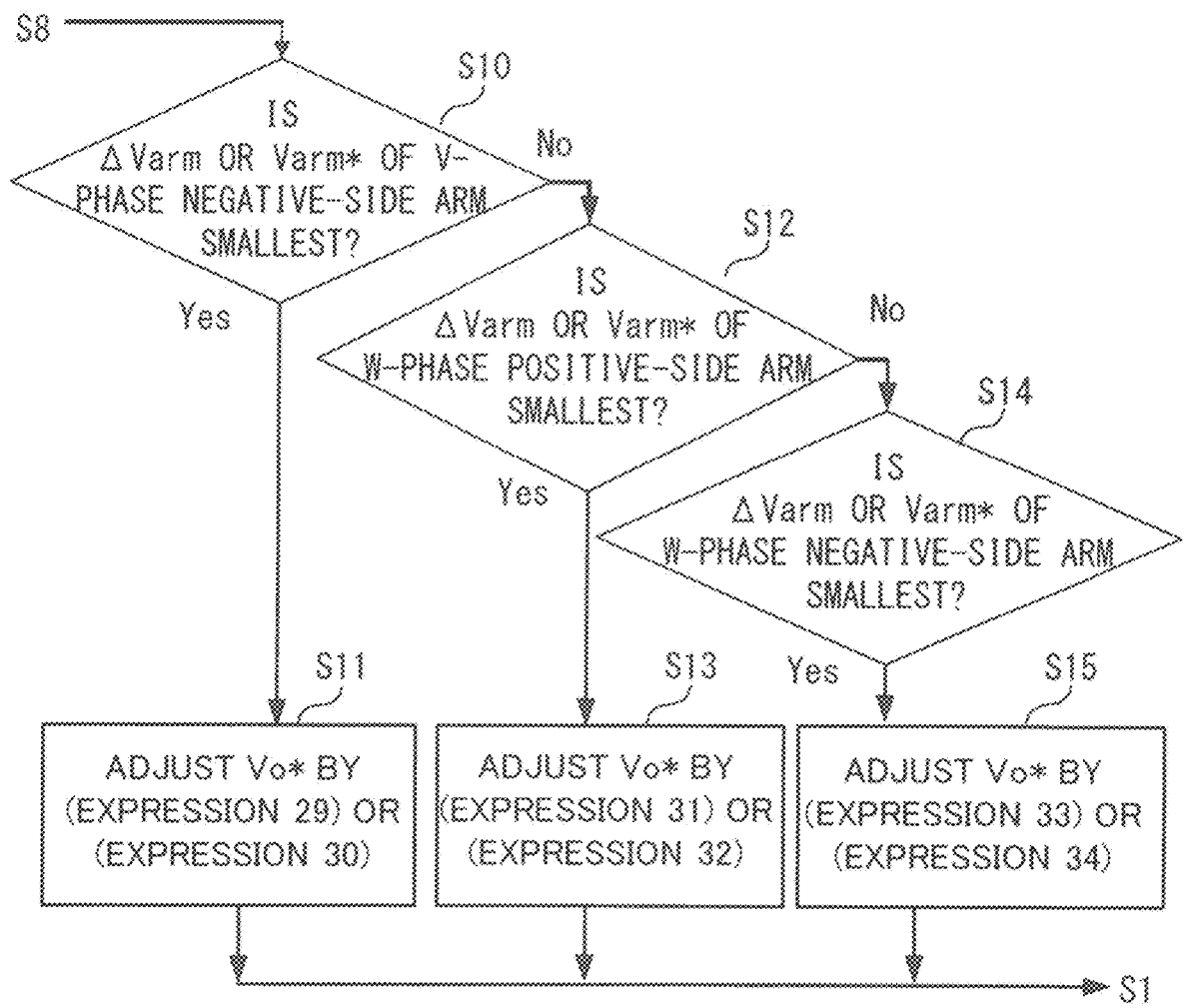
FIG. 11 is a control flowchart of the control device according to embodiment 1.

FIG. 10 and FIG. 11 are flowcharts showing adjustment control in the second control of the control device 50 according to embodiment 1.

In the adjustment control, the zero-phase-sequence voltage command value generation unit 56 of the control device 50 receives the arm voltage command value Varm*, the DC capacitor voltages Vcap of the DC capacitors 13 in all the converter cells 11 included in each arm 10, the AC voltage Vac, and the phase signal 58a, and adjusts the zero-phase-sequence voltage command value Vo* on the basis of a tolerance (control allowance) of the arm voltage command value Varm* with respect to the limit values Vc, 0 of the output voltage range.

With reference to FIG. 10, first, in step S1, the zero-phase-sequence voltage command value generation unit 56 receives the arm voltage command value Varm* for each arm 10. The arm voltage command value Varm* is generated by the voltage command value generation unit 57 using the following (Expression 11) to (Expression 16).

$$Varmpu^* = -Vacu^*/2 + Vdc/2 + Vz^* \quad \text{(Expression 11)}$$

$$Varmnu^* = Vacu^*/2 + Vdc/2 + Vz^* \quad \text{(Expression 12)}$$

$$Varmpv^* = -Vacv^*/2 + Vdc/2 + Vz^* \quad \text{(Expression 13)}$$

$$Varmnv^* = Vacv^*/2 + Vdc/2 + Vz^* \quad \text{(Expression 14)}$$

$$Varmpw^* = -Vacw^*/2 + Vdc/2 + Vz^* \quad \text{(Expression 15)}$$

$$Varmnw^* = Vacw^*/2 + Vdc/2 + Vz^* \quad \text{(Expression 16)}$$

Next, in step S2, the zero-phase-sequence voltage command value generation unit 56 receives the DC capacitor voltages Vcap detected by the voltage sensors 14 in the converter cells 11, and adds all the DC capacitor voltages Vcap in each arm 10. Thus, the zero-phase-sequence voltage command value generation unit 56 calculates a sum ΣVcap (ΣVcappu, ΣVcappv, ΣVcappw, ΣVcapnu, ΣVcapnv, ΣVcapnw) of the capacitor voltages for each arm 10.

Next, in step S3, the zero-phase-sequence voltage command value generation unit 56 calculates a first deviation ΔVarm which is difference voltage representing control allowance of the arm voltage command value Varm* for each arm 10 with respect to the DC capacitor voltages Vcap in the corresponding arm 10. The first deviation voltage ΔVarm is calculated by (Expression 17) to (Expression 19) in a case of the AC voltage command values for the positive-side arms 10P, and is calculated by (Expression 20) to (Expression 22) in a case of the AC voltage commands for the negative-side arms 10N.

$$\Delta Varmpu = \Sigma Vcappu - Varmpu^* \quad \text{(Expression 17)}$$

$$\Delta Varmpv = \Sigma Vcappv - Varmpv^* \quad \text{(Expression 18)}$$

$$\Delta Varmpw = \Sigma Vcappw - Varmpw^* \quad \text{(Expression 19)}$$

$$\Delta Varmnu = \Sigma Vcapnu - Varmnu^* \quad \text{(Expression 20)}$$

$$\Delta Varmnv = \Sigma Vcapnv - Varmnv^* \quad \text{(Expression 21)}$$

$$\Delta Varmnw = \Sigma Vcapnw - Varmnw^* \quad \text{(Expression 22)}$$

Further, control allowance of the arm voltage command value Varm* for each arm 10 with respect to the lower limit value 0 of the output voltage range is a second deviation Varm* which is a difference voltage between the arm voltage command value Varm* for the arm 10 and the lower limit value 0 of the output voltage range. That is, the value of the second deviation Varm* of each arm 10 is just the voltage command value Varm* for each arm 10, unless the polarity thereof is not considered.

In the subsequent steps from S4, the zero-phase-sequence voltage command value Vo* is adjusted on the basis of the arm voltage command value Varm* for the arm 10 of which the first deviation ΔVarm or the second deviation Varm* is smallest among the arms 10, i.e., the arm voltage command value Varm* for the arm 10 for which control allowance of the arm voltage command value Varm* with respect to the limit value Vc, 0 of the output voltage range is smallest.

First, in step S4, if the first deviation ΔVarmpu or the second deviation Varmpu* of the u-phase positive-side arm 10uP is smallest among the first deviations ΔVarm and the second deviations Varm* of the arms 10 for all the phases (step S4, Yes), the process proceeds to step S5, and the zero-phase-sequence voltage command value Vo* is adjusted by the following (Expression 23) or (Expression 24).

If the first deviation ΔVarmpu of the u-phase positive-side arm 10uP is smallest, the following expression is used.

$$Vo^* = Varmpu^* - \Sigma Vcappu \quad \text{(Expression 23)}$$

If the second deviation Varmpu* of the u-phase positive-side arm 10uP is smallest, the following expression is used.

$$Vo^* = Varmpu^* \quad \text{(Expression 24)}$$

In step S6, if the first deviation ΔVarmnu or the second deviation Varmnu* of the u-phase negative-side arm is smallest among the first deviations ΔVarm and the second deviations Varm* of the arms 10 for all the phases (step S6, Yes), the process proceeds to step S7, and the zero-phase-sequence voltage command value Vo* is adjusted by the following (Expression 25) or (Expression 26).

If the first deviation ΔVarmnu of the u-phase negative-side arm 10uN is smallest, the following expression is used.

$$Vo^* = -Varmnu^* + \Sigma Vcapnu \quad \text{(Expression 25)}$$

If the second deviation Varmnu* of the u-phase negative-side arm 10uN is smallest, the following expression is used.

$$Vo^* = -Varmnu^* \quad \text{(Expression 26)}$$

In step S8, if the first deviation ΔVarmpv or the second deviation Varmpv* of the v-phase positive-side arm 10vP is smallest among the first deviations ΔVarm and the second deviations Varm* of the arms 10 for all the phases (step S10, Yes), the process proceeds to step S9, and the zero-phase-sequence voltage command value Vo* is adjusted by the following (Expression 27) or (Expression 28).

If the first deviation ΔVarmpv of the v-phase positive-side arm 10vP is smallest, the following expression is used.

$$Vo^* = Varmpv^* - \Sigma Vcappv \quad \text{(Expression 27)}$$

If the second deviation Varmpv* of the v-phase positive-side arm 10vP is smallest, the following expression is used.

$$Vo^* = Varmpv^* \quad \text{(Expression 28)}$$

In addition, with reference to FIG. 11, in step S10, if the first deviation ΔVarmnv or the second deviation Varmnv* of the v-phase negative-side arm vN is smallest among the first deviations ΔVarm and the second deviations Varm* of the arms 10 for all the phases (step S10, Yes), the process proceeds to step S11, and the zero-phase-sequence voltage command value Vo* is adjusted by (Expression 29) or (Expression 30).

If the first deviation ΔVarmnv of the v-phase negative-side arm 10vN is smallest, the following expression is used.

$$Vo^* = -Varmnv^* + \Sigma Vcapnv \quad \text{(Expression 29)}$$

If the second deviation Varmnv* of the v-phase negative-side arm 10vN is smallest, the following expression is used.

$$Vo^* = -Varmnv^* \quad \text{(Expression 30)}$$

In step S12, if the first deviation ΔVarmpw or the second deviation Varmpw* of the w-phase positive-side arm wP is smallest among the first deviations ΔVarm and the second deviations Varm* of the arms 10 for all the phases (Yes in step S12), the process proceeds to step S13, and the zero-phase-sequence voltage command value Vo* is adjusted by (Expression 31) or (Expression 32).

If the first deviation ΔVarmpw of the w-phase positive-side arm 10wP is smallest, the following expression is used.

$$Vo^* = Varmpw^* - \Sigma Vcappw \quad \text{(Expression 31)}$$

If the second deviation Varmpw* of the w-phase positive-side arm 10wP is smallest, the following expression is used.

$$Vo^* = Varmpw^* \quad \text{(Expression 32)}$$

In step S14, if the first deviation ΔVarmnw or the second deviation Varmnw* of the w-phase negative-side arm is smallest among the first deviations ΔVarm and the second deviations Varm* of the arms 10 for all the phases (step S14, Yes), the process proceeds to step S15, and the zero-phase-sequence voltage command value Vo* is adjusted by (Expression 33) or (Expression 34).

If the first deviation ΔVarmnw of the w-phase negative-side arm 10 is smallest, the following expression is used.

$$Vo^* = -Varmnw^* + \Sigma Vcapnw \quad \text{(Expression 33)}$$

If the second deviation Varmnw* of the w-phase negative-side arm 10 is smallest, the following expression is used.

$$Vo^* = -Varmnw^* \quad \text{(Expression 34)}$$

The zero-phase-sequence voltage command value Vo* adjusted through the adjustment control as described above is subtracted from the positive-side arm voltage command value Varmp* and added to the negative-side arm voltage command value Varmn* as shown in FIG. 5, to correct the positive-side arm voltage command value Varmp* and the negative-side arm voltage command value Varmn*. The corrected positive-side arm voltage command value Varmp* and the corrected negative-side arm voltage command value Varmn* are respectively inputted to the positive-side arm modulation command generation unit 53p and the negative-side arm modulation command generation unit 53n.

As described above, in the adjustment control in the second control, the control device 50 calculates, for each arm 10, the first deviation ΔVarm or the second deviation Varm* which is control allowance representing a tolerance of the arm voltage command value Varm* with respect to the limit value of the output voltage range of the arm 10. Then, the control device 50 performs adjustment of the zero-phase-sequence voltage command value Vo* as shown in the above (Expression 23) to (Expression 34), using the first deviation ΔVarm or the second deviation Varm* which is smallest among the calculated first deviations ΔVarm and second deviations Varm* of the arms 10 for the respective phases. Then, the control device 50 adds/subtracts the adjusted zero-phase-sequence voltage command value Vo* to/from the arm voltage command value Varm*, thereby correcting the arm voltage command value Varm*. In this way, the control device 50 adjusts the arm voltage command value Varm* for the arm 10 for which the control allowance is smallest so that the arm voltage command value Varm* coincides with the limit value of the output voltage range. Thus, the arm voltage command values Varm* for all the arms 10 included in the power conversion device 100 are adjusted so as not to go outside of the limit values of the output voltage range.

Therefore, even in the case where the power conversion device has such a configuration, specifications, an operation condition, or the like that, as shown in FIG. 9, the arm voltage command value Varm* becomes greater than the limit value Vc of the output voltage range even though the harmonic control in the second control using the zero-phase-sequence voltage command value Vo* having a sinewave with a frequency that is three times the fundamental frequency f is performed, the adjustment control in the second control is steadily executed, whereby, during the entire operation period of the power converter 1, the arm voltage command values Varm* are adjusted so as to coincide with the limit value without going outside of the limit value of the output voltage range.

Hereinafter, a case where the power conversion device 100 steadily performs the first control in which the arm voltage command value Varm* is not corrected and a case where the power conversion device 100 steadily performs the adjustment control in the second control in which the arm voltage command value Varm* is corrected, will be described with reference to the drawings.

In the above description, the case of performing the adjustment control in the second control for the power conversion device 100 having such a configuration, specifications, an operation condition, or the like that the arm voltage command value Varm* goes outside of the limit value of the output voltage range as shown in FIG. 9, has been described.

In the following description, a case of performing the adjustment control for the power conversion device 100 having such a configuration, specifications, an operation condition, or the like that the arm voltage command value Varm* does not go outside of the limit values of the output voltage range, will be described compared to a case of performing the first control.

Figure 12:
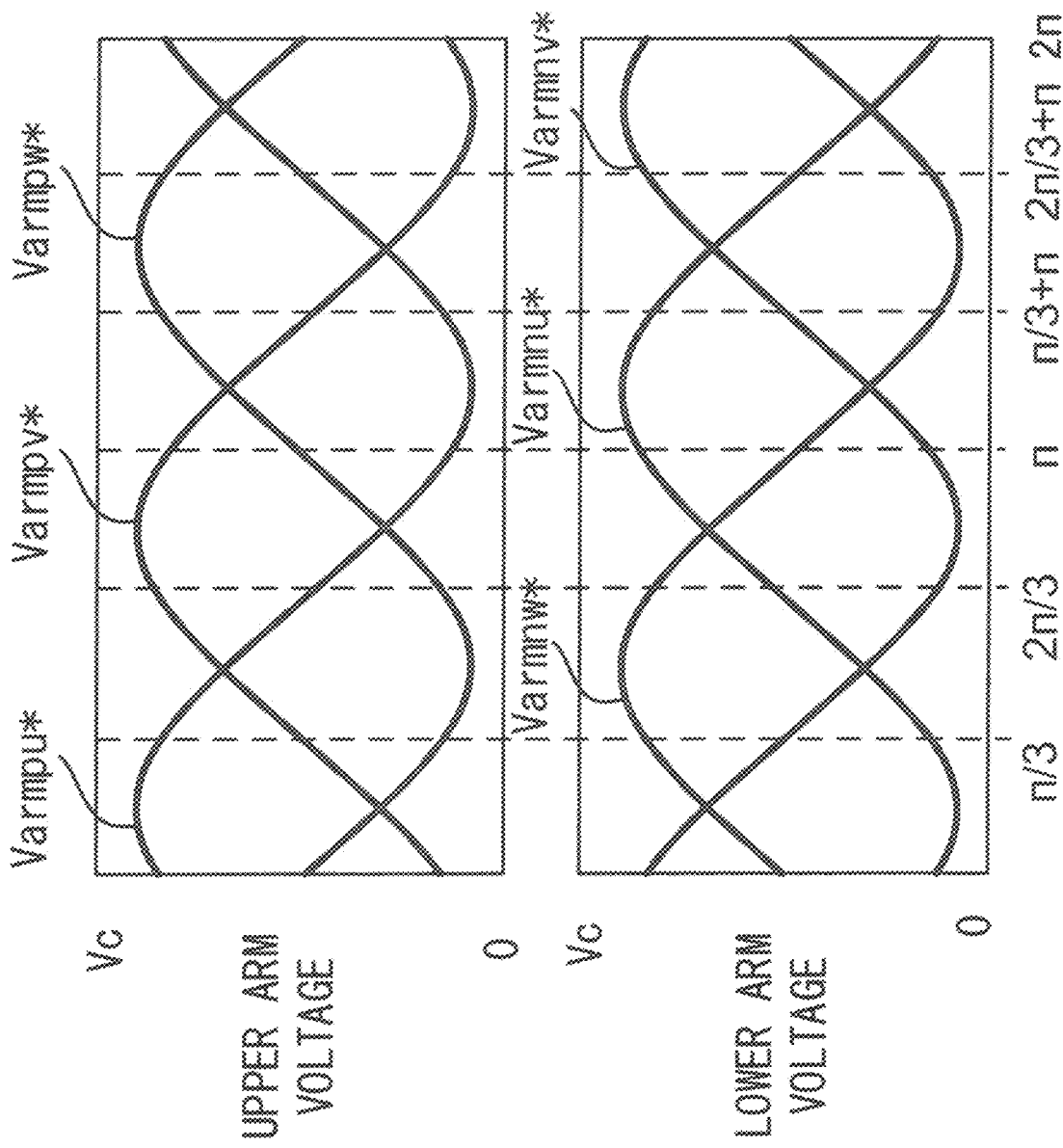
FIG. 12 is a waveform diagram showing the arm voltage command values in the first control of the control device according to embodiment 1, and the limit values of the range of voltage that the arm can output.

FIG. 12 is a waveform diagram showing the arm voltage command values Varm* and the limit values of the range of voltage that the arm 10 can output, in the case of steadily performing the first control in which the zero-phase-sequence voltage command value Vo* is not adjusted, in the power conversion device 100 having such a configuration, specifications, an operation condition, or the like that the arm voltage command values Varm* do not go outside of the limit values Vc, 0 of the output voltage range.

Figure 13:
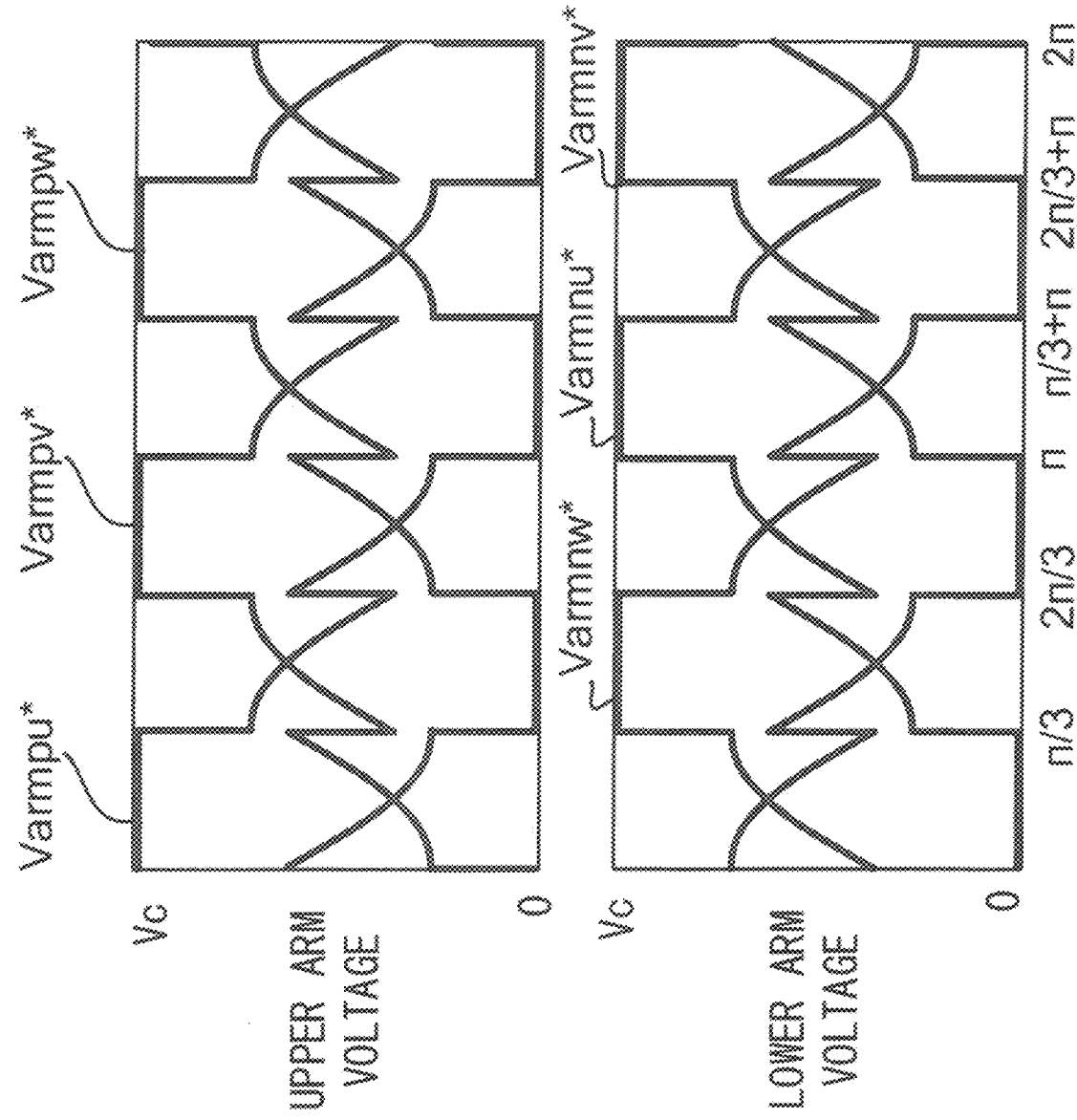
FIG. 13 is a waveform diagram showing the arm voltage command values when adjustment control is executed in the second control of the control device according to embodiment 1, and the limit values of the range of voltage that the arm can output.

FIG. 13 is a waveform diagram showing the arm voltage command values Varm* and the limit values of the range of voltage that the arm 10 can output, in the case of steadily performing the adjustment control in the second control in which the zero-phase-sequence voltage command value Vo* is adjusted, in the power conversion device 100 having such a configuration, specifications, an operation condition, or the like that the arm voltage command values Varm* do not go outside of the limit values of the output voltage range.

In FIG. 12 and FIG. 13, a state in which there is no pulsation in the capacitor voltage Vc which is the upper limit value of the output voltage range is shown, for convenience of illustration.

In FIG. 12, in a phase interval of 0 to Π/3, among the control allowances of the arm voltage command values Varm* for u, v, w phases with respect to the limit values Vc, 0 of the output voltage range, the control allowance of the arm voltage command value Varmpu*, Varmnu* for u phase (the first deviation ΔVarmpu of the upper arm or the second deviation Varmnu* of the lower arm) is smallest.

Here, it is assumed that the first deviation ΔVarmpu of the positive-side arm 10uP and the second deviation Varmnu* of the negative-side arm 10uN for u phase are substantially the same value. In this case, the control device 50 adjusts the zero-phase-sequence voltage command value Vo* on the basis of the above (Expression 23) or (Expression 24).

As a result, as shown in FIG. 13, in the phase interval of 0 to Π/3, the arm voltage command values Varm* (Varmpu*, Varmnu*) for u phase are controlled so as to coincide with the limit values Vc, 0 of the output voltage range without going outside of the limit values.

As shown in FIG. 12, for the arm voltage command values Varm* before correction, the control allowances (first deviation ΔVarm, second deviation Varm*) change along with phase change in the phase interval of 0 to Π/3. Even in the case where the control allowances change along with phase change in the control cycle, the control device 50 of the present embodiment adjusts the zero-phase-sequence voltage command value Vo* on the basis of the control allowances for each control cycle. Thus, the arm voltage command values Varm* are accurately adjusted to be equivalent to the limit values of the output voltage range constantly.

In addition, with reference to FIG. 12, in a phase interval of Π/3 to 2Π/3, the control allowance of the arm voltage command value Varm* for w phase (the second deviation Varmpw* of the upper arm or the first deviation ΔVarmnw of the lower arm) is smallest. In addition, in a phase interval of 2Π/3 to Π, the control allowance for v phase (the first deviation ΔVarmpv of the upper arm or the second deviation Varmnv* of the lower arm) is smallest.

In this case, as in the above case of u phase, as shown in FIG. 13, in the phase interval of Π/3 to 2Π/3, the arm voltage command values Varm* (Varmpw*, Varmnw*) for w phase are adjusted so as to coincide with the limit values Vc, 0 of the output voltage range. In addition, in the phase interval of 2Π/3 to n, the arm voltage command values Varm* (Varmpv*, Varmnv*) for v phase are adjusted so as to coincide with the limit values Vc, 0 of the output voltage range.

In this way, the adjustment control is constantly executed for each control cycle (in FIG. 13, the phase interval of 0 to 2Π) of the power converter 1. That is, at any operation point of time during the operation period of the power converter 1, the arm voltage command value Varm* for at least one arm 10 is controlled to be equivalent to the limit value Vc, 0 of the output voltage range.

Here, in the case where the converter cell 11 has the series unit having the semiconductor switching elements 12 in both of the upper arm and the lower arm as shown in FIG. 2 to FIG. 4, in the adjustment control for causing the arm voltage command value Varm* to coincide with the limit value of the output voltage range as described above, the control device 50 performs control so that, of the semiconductor switching elements 12 in the upper arm and the lower arm, either one is fixed in an ON state and the other one is fixed in an OFF state so as not to perform switching, in the interval in which the arm voltage command value Varm* becomes Vc or 0.

Therefore, at any operation point of time during the operation period of the power converter 1, control is performed so that the arms 10 in which switching of the semiconductor switching elements 12 is not performed are present for at least one phase. Thus, over the entire operation period of the power converter 1, switching loss of the semiconductor switching elements of the converter cells for at least one phase is reduced, whereby efficiency of the power converter 1 can be enhanced.

The control allowance of the arm voltage command value Varm* with respect to the limit value of the output voltage range is not limited to the difference voltage (first deviation ΔVarm, second deviation Varm*) between the arm voltage command value Varm* and the limit value as described above. For example, as the control allowance, the ratio of the arm voltage command value Varm to the limit value of the output voltage range of the arm 10 may be used. In this case, the zero-phase-sequence voltage command value Vo* may be adjusted using the ratio as the control allowance.

The zero-phase-sequence voltage command value Vo* shown in (Expression 2) has a sinewave with a frequency that is three times the frequency of the AC voltage command value Vac*. However, the zero-phase-sequence voltage command value Vo* may have a sinewave with a frequency represented by (P×(2N−1)). Here, P is the number of phases of AC, and N is an integer not less than 1.

In the above description, the example in which the arm voltage command value Varm* is controlled so as to coincide with the limit value of voltage that the arm 10 can output, has been shown. However, the arm voltage command value Varm* may be controlled within a voltage range equivalent to the limit value. The voltage range of the arm voltage command value Varm* equivalent to the limit value is such a voltage range that can ensure a state in which, of the semiconductor switching elements 12 in the upper arm and the lower arm that the converter cell 11 has, either one is fixed in an ON state and the other one is fixed in an OFF state and thus switching is not performed.

The arm voltage command value Varm* to be corrected by the adjustment control is not limited to one arm voltage command value Varm*. If there are a plurality of arm voltage command values Varm* for which tolerances with respect to the limit values are smallest, the adjustment control may be performed for all the arm voltage command values Varm* for which tolerances with respect to the limit values are smallest.

The power conversion device of the present embodiment configured as described above includes: a power converter including, for respective phases of AC, leg circuits each including a pair of arms connected in series to each other, the arms each including a plurality of converter cells which are connected in series and each of which has an energy storage element and a plurality of semiconductor elements, the leg circuits being connected in parallel between positive and negative DC terminals, the power converter being configured to perform power conversion between AC and DC; and a control unit for controlling the power converter. The control unit includes a command value correction unit which corrects an arm voltage command value for each arm for controlling outputs of the converter cells in the arm, by a zero-phase-sequence voltage command value. The command value correction unit performs adjustment control for adjusting the zero-phase-sequence voltage command value so that at least one of the arm voltage command values becomes equivalent to a limit value of an output voltage range of the arm.

In the multilevel converter in which a plurality of converter cells each including a DC capacitor are connected in series in a multiplexed manner, pulsation occurs in the capacitor voltage in each arm. Accordingly, as described above, the power conversion device of the present embodiment includes the command value correction unit which performs adjustment control for adjusting the zero-phase-sequence voltage command value so that at least one arm voltage command value becomes equivalent to the limit value of the output voltage range of the arm.

Thus, a phenomenon in which the arm voltage command values significantly go outside of the limit values of the output voltage range so that voltage cannot be outputted, is prevented, whereby operation stability can be ensured, and also the voltage usage ratio is maximally increased and the efficiency can be enhanced. In addition, also in the power conversion device having such a configuration, specifications, or an operation condition that the arm voltage command values do not reach the limit values of the output voltage range, the arm voltage command values are adjusted to be equivalent to the limit values of the output voltage range, whereby the voltage usage ratio can be maximally increased.

Further, with the arm voltage command value adjusted to be equivalent to the limit value of the output voltage range, the semiconductor switching elements in each converter cell in the arm controlled by the adjusted arm voltage command value can be controlled into a state of almost not performing switching. In the multilevel converter in which a plurality of converter cells each having semiconductor switching elements are connected in a multiplexed manner, if switching is less performed in each converter cell as described above, it becomes possible to significantly reduce switching loss in the power conversion device.

In the power conversion device of the present embodiment configured as described above, the control unit performs, for the arm voltage command value of which a tolerance with respect to the limit value is smallest among a plurality of the arm voltage command values, the adjustment control for adjusting the zero-phase-sequence voltage command value by the command value correction unit using the tolerance of the arm voltage command value.

As described above, by performing the adjustment control using the tolerance of the arm voltage command value for the arm of which the control allowance is smallest, the arm voltage command values for all the arms can be adjusted so as not to go outside of the limit values of the output voltage range. Thus, operation stability of the power conversion device can be further ensured.

In the power conversion device of the present embodiment configured as described above, in the adjustment control, the control unit adjusts the zero-phase-sequence voltage command value, using the tolerance for each control cycle of the arm voltage command value.

Thus, even in a case where the control allowances of the arm voltage command values with respect to the limit values of the output voltage range change along with phase change in the control cycle, the zero-phase-sequence voltage command value Vo* is adjusted in accordance with the control allowances for each control cycle. In this way, during the operation period of the power converter, the arm voltage command values Varm* can be accurately adjusted so as to be equivalent to the limit values of the output voltage range.

In the power conversion device of the present embodiment configured as described above, each converter cell includes a series unit having semiconductor switching elements as the semiconductor elements in both of an upper arm and a lower arm, such that the series unit and the energy storage element are connected in parallel. In the adjustment control, for the arm to be controlled by the arm voltage command value adjusted so as to become equivalent to the limit value, the control unit performs control so that, of the semiconductor switching elements in the upper arm and the lower arm of each converter cell of the arm, either one is fixed in an ON state and another one is fixed in an OFF state.

As described above, in an interval in which the arm voltage command value Varm* for the arm for which adjustment control is performed becomes Vc or 0, of the semiconductor switching elements in the upper arm and the lower arm composing the series unit in each converter cell of the above arm, either one is fixed in an ON state and the other one is fixed in an OFF state, whereby voltage corresponding to the output limit value is outputted. Thus, great reduction of switching loss in the power conversion device can be assuredly achieved.

In the power conversion device of the present embodiment configured as described above, the tolerance is a first deviation which is a difference between the arm voltage command value and an upper limit value of the limit value, or a second deviation which is a difference between the arm voltage command value and a lower limit value of the limit value.

As described above, the tolerance as the control allowance to be used in adjustment control is calculated on the basis of differences from the upper limit value and the lower limit value of the output voltage range. Thus, calculation of the tolerance is simplified and the arm voltage command values can be prevented from going outside of both limit values of the upper limit value and the lower limit value.

In the power conversion device of the present embodiment configured as described above, the control unit performs determination control for determining whether or not to execute the adjustment control, using a sum of voltage values of all the energy storage elements in each arm as the limit value.

In the multilevel converter, energy variation occurs in each arm due to transfer of energy between the upper arm and the lower arm, or the like. Along with this, the capacitor voltage in each arm also changes. Therefore, by monitoring the sum of the voltage values of all the energy storage elements in each arm during operation of the power conversion device and determining whether or not to perform adjustment control, it becomes possible to appropriately execute adjustment control during operation.

In the power conversion device of the present embodiment configured as described above, the control unit executes the adjustment control during an entire operation period in which power conversion operation of the power converter is performed, and at least one of the arm voltage command values is adjusted to be equivalent to the limit value, at each point of time during the operation period of the power converter.

By steadily performing adjustment control during the entire operation period of the power converter as described above, control is performed so that the arms in which switching of the semiconductor switching elements is not performed are present for at least one phase, at any operation point of time during the operation period of the power converter. Thus, over the entire operation period of the power converter, switching loss of the semiconductor switching elements for at least one phase can be reduced. This results in enhancement of efficiency of the power converter.

Embodiment 2

Hereinafter, embodiment 2 of the present disclosure will be described with reference to the drawings, focusing on differences from the above embodiment 1. The same parts as those in the above embodiment 1 are denoted by the same reference characters and description thereof is omitted.

In embodiment 2, control of the control device 50 in a case where overmodulation occurs due to failure such as a ground fault of the AC grid, for example, will be described.

Figure 14:
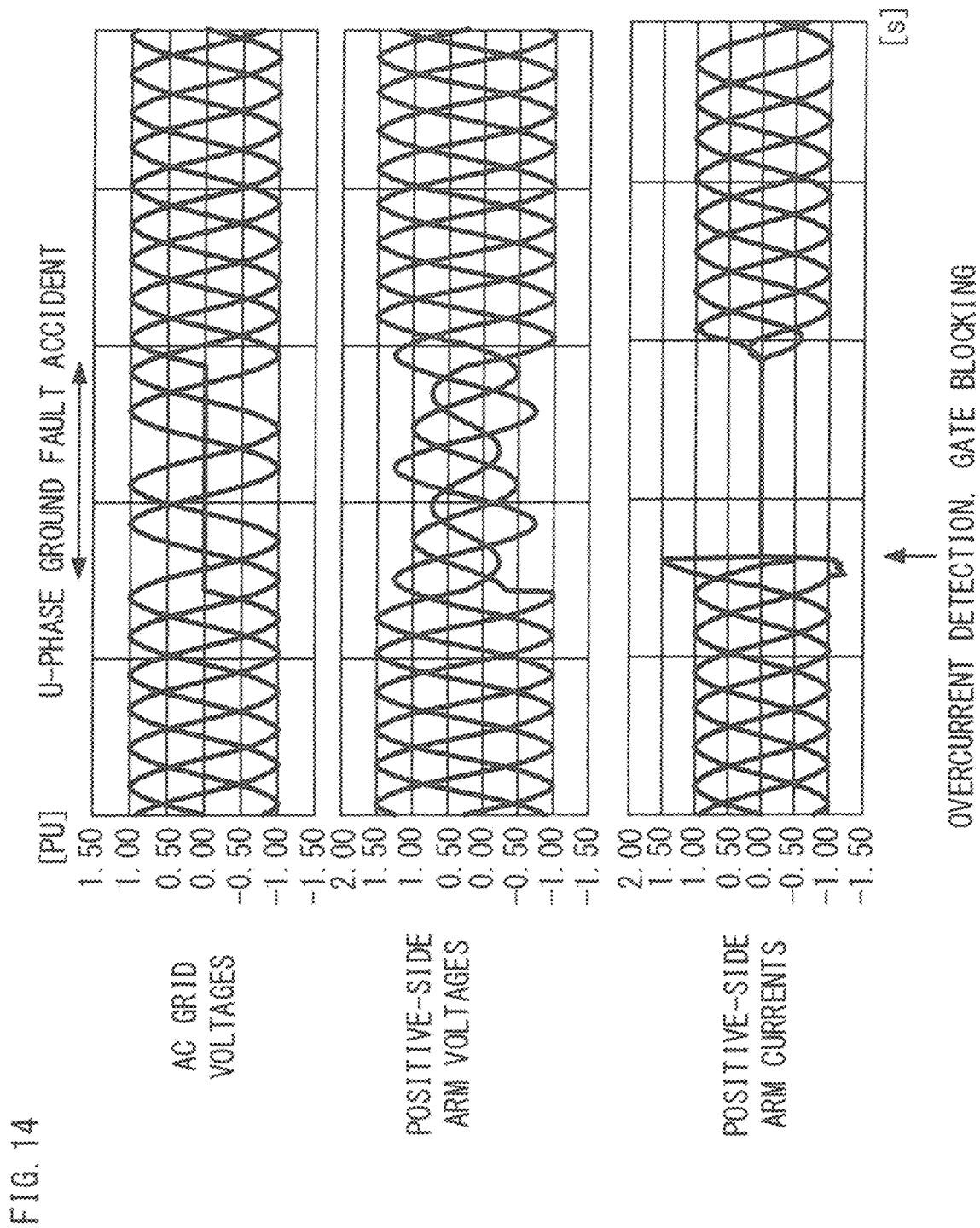
FIG. 14 shows waveform examples of AC grid voltages when a ground fault occurs on an AC grid, and arm voltages and arm currents of a power converter at this time.

FIG. 14 shows waveform examples of AC grid voltages when a u-phase ground fault occurs on the AC grid, and positive-side arm voltages and positive-side arm currents of the power converter 1 at this time.

As shown in FIG. 14, when a ground fault occurs in u phase of the three-phase AC grid, the positive-side arm voltages are imbalanced among the three phases, so that arm voltage for u phase and arm voltage for v phase are reduced and current for v phase becomes overcurrent. In this case, the power conversion device 100 detects the overcurrent and performs gate blocking. In such a case where a ground fault occurs on the AC grid, since the arm voltages for the three phases are imbalanced, the zero-phase-sequence voltage greatly varies.

In the control device 50 of embodiment 1, adjustment control is steadily executed during the operation period of the power converter 1. However, if adjustment for the zero-phase-sequence voltage command value Vo* is constantly performed, when the zero-phase-sequence voltage suddenly changes, it is impossible to appropriately perform adjustment for the zero-phase-sequence voltage command value Vo* in accordance with the sudden change, and thus unnecessary current to the ground might occur.

In the present embodiment, the control device 50 executes adjustment control only when the arm voltage command value Varm* goes outside of the limit value of the output voltage range and results in overmodulation.

Figure 15:
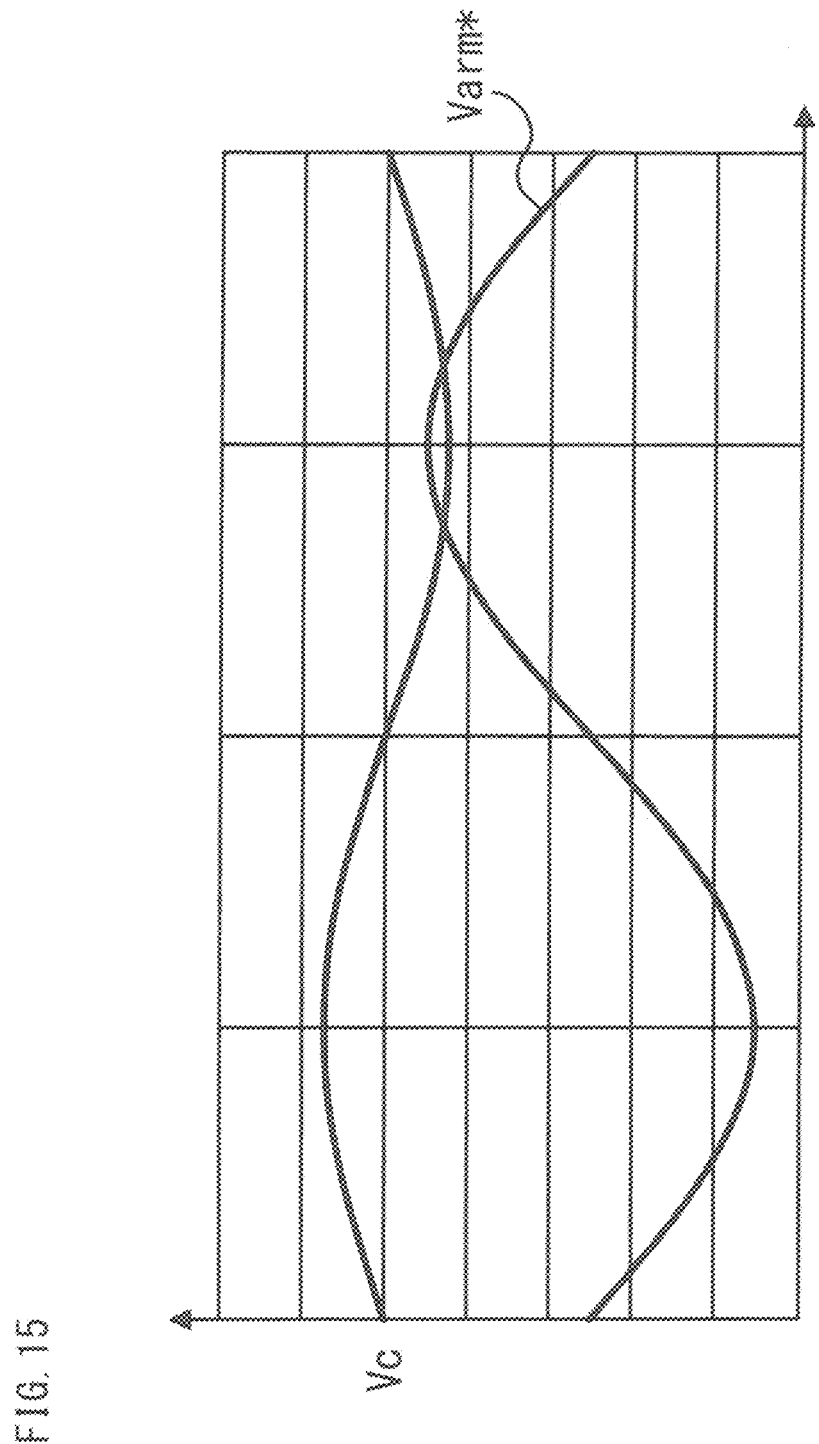
FIG. 15 is a waveform diagram showing the arm voltage command value and the limit value of the range of voltage that the arm can output, in a case where voltage pulsation occurs in DC capacitor voltage.

FIG. 15 is a waveform diagram showing an example in which the arm voltage command value Varm* goes outside of the limit value of the range of voltage that the arm can output, due to a ground fault on the AC grid or the like.

In FIG. 15, there is a part where the arm voltage command value Varm* becomes greater than the limit value Vc of the output voltage range so that overmodulation occurs.

Figure 16:
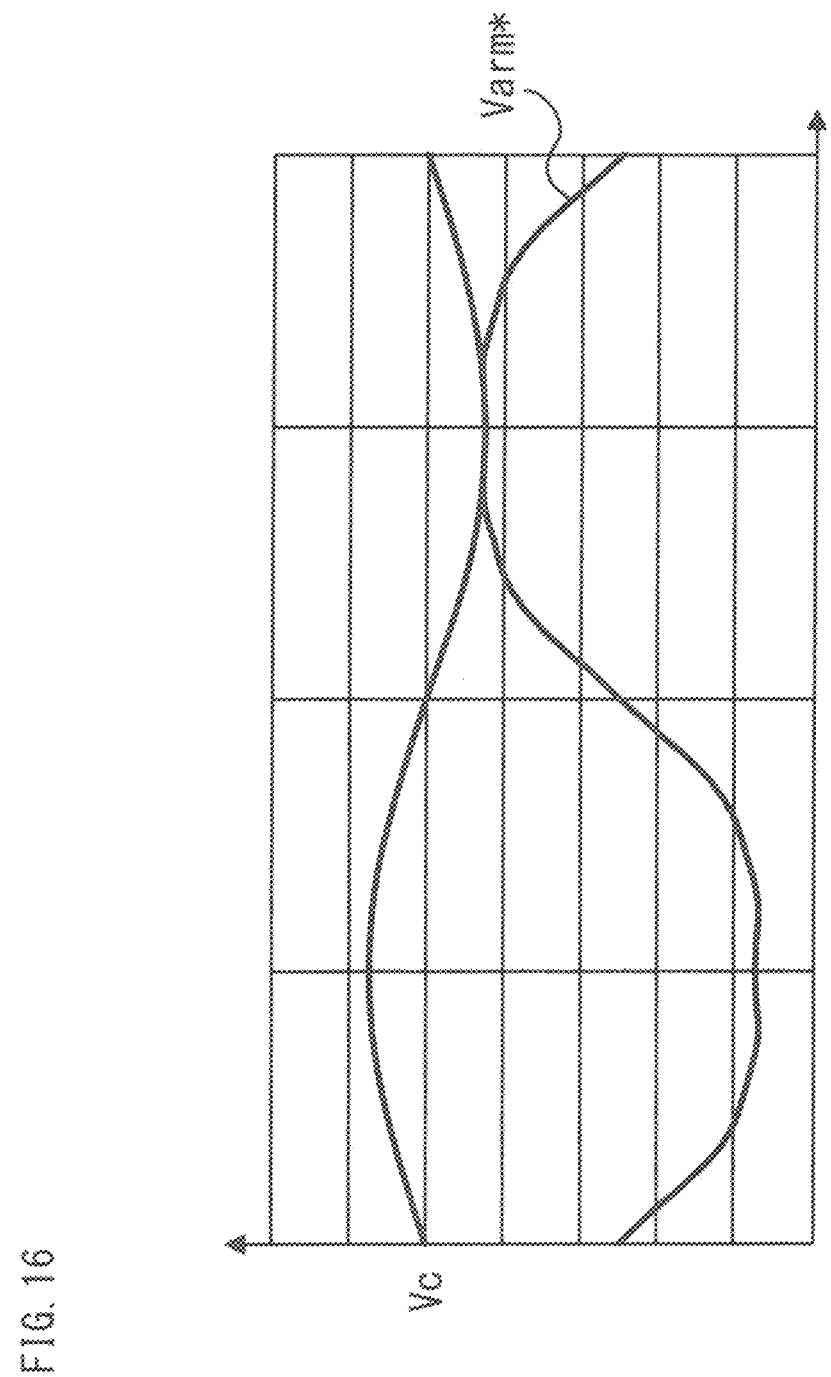
FIG. 16 is a waveform diagram showing an arm voltage command value and the limit value of the range of voltage that the arm can output, according to embodiment 2.

FIG. 16 is a waveform diagram showing the arm voltage command value Varm* and the limit value of the range of voltage that the arm 10 can output, in a case of performing adjustment control in the second control for the arm voltage command value Varm* shown in FIG. 15.

Figure 17:
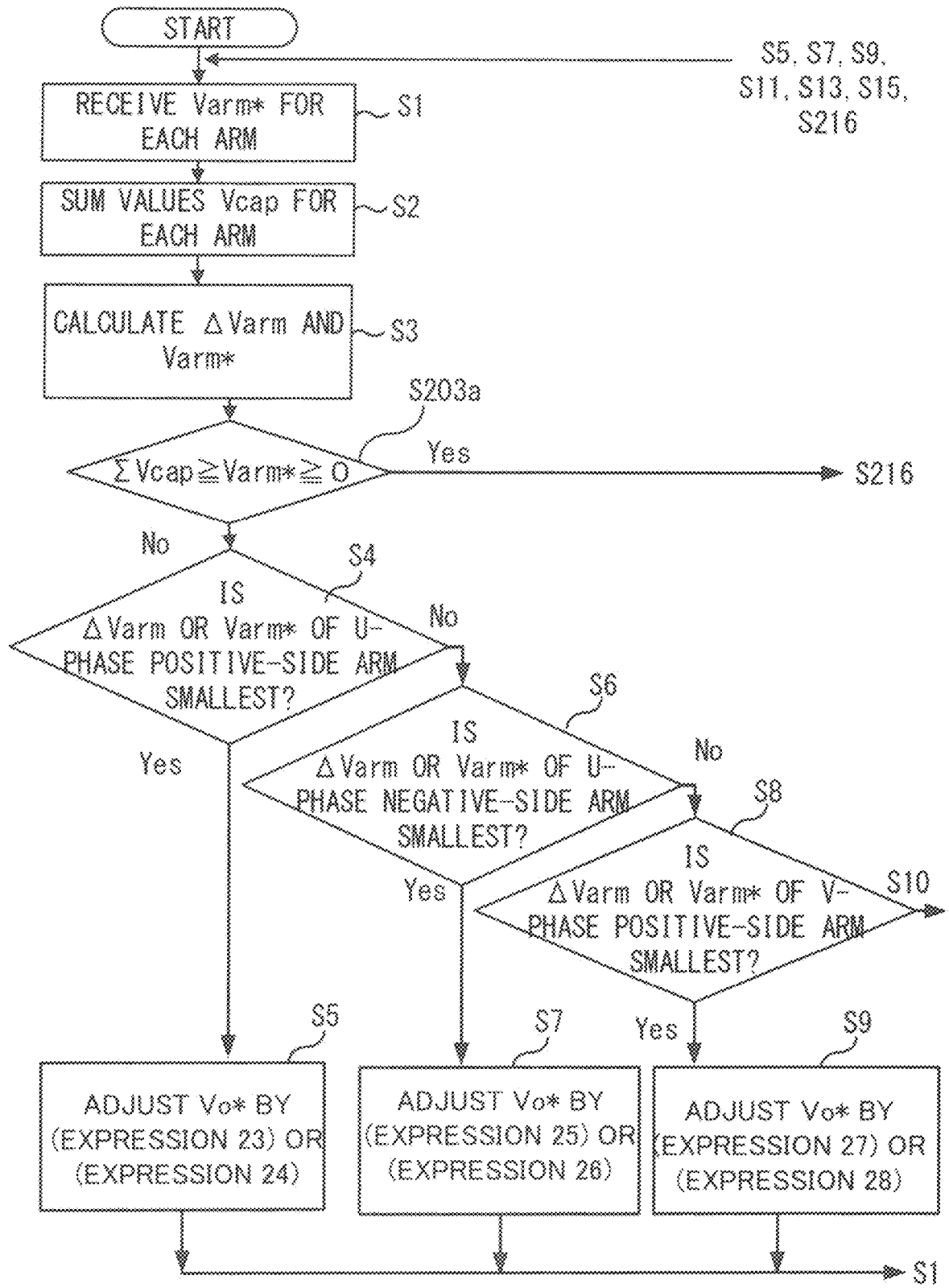
FIG. 17 is a flowchart showing control of a control device according to embodiment 2.
Figure 18:
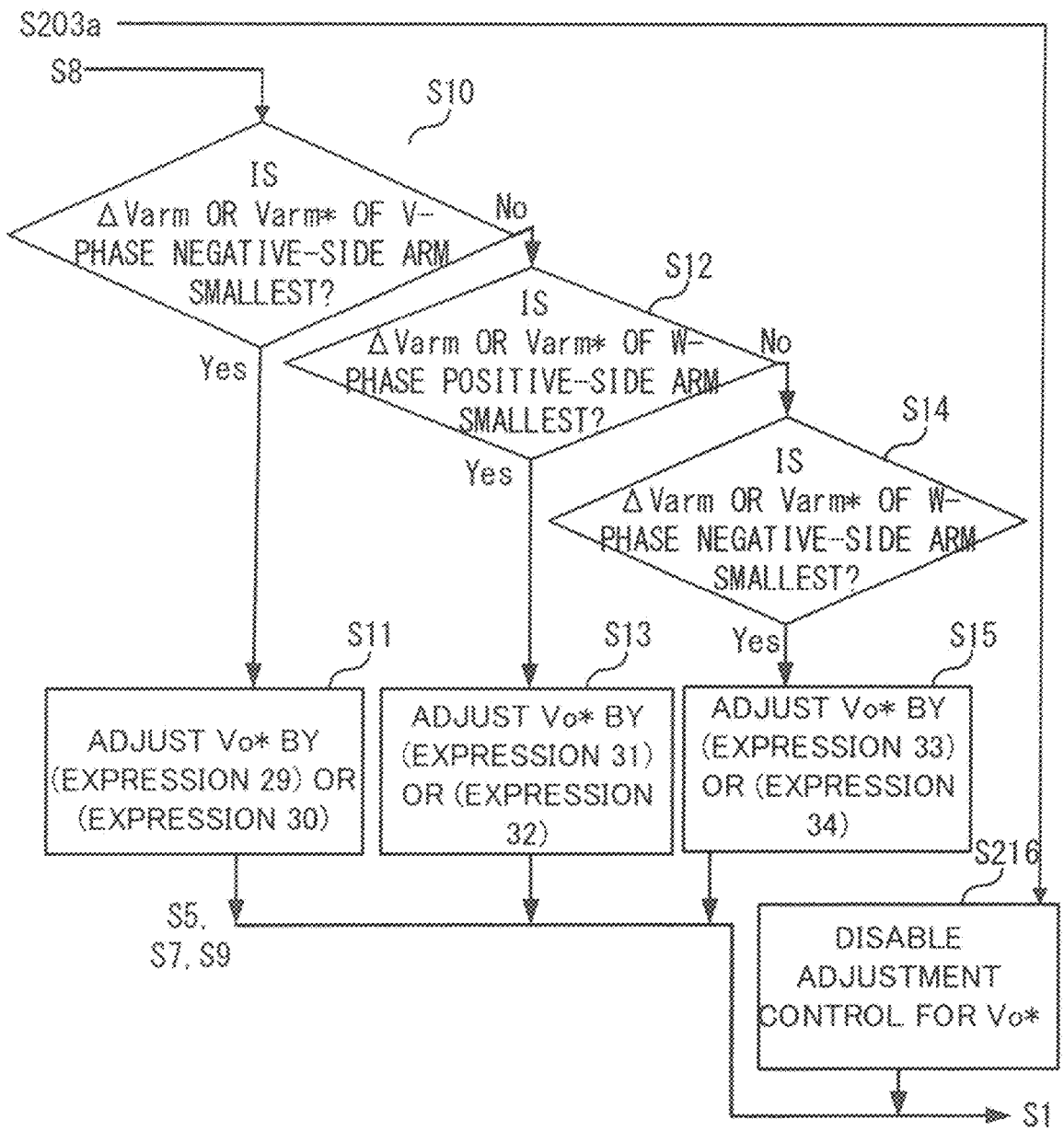
FIG. 18 is a flowchart showing control of the control device according to embodiment 2.

FIG. 17 and FIG. 18 are flowcharts showing control of the control device 50 according to embodiment 2.

In FIG. 17 and FIG. 18, steps other than steps S203a and S216 are the same as those in embodiment 1.

With reference to FIG. 17, as in embodiment 1, through steps S1 to S3, the control device 50 calculates the first deviation ΔVarm and the second deviation Varm* representing the control allowances of the arm voltage command value Varm* with respect to the limit values of the output voltage range.

In step S203a, the control device 50 determines whether or not the voltage command value Varm* for the arm is 0 or more and the sum Vcap of the DC capacitor voltages Vcap or less.

If ΣVcap≥Varm*≥0 is satisfied (step S203a, Yes), the control device 50 proceeds to step S216 and does not perform adjustment control in the second control. In this case, the control device 50 executes the first control in which the zero-phase-sequence voltage command value Vo* is not corrected or the harmonic control in the second control for adjusting the zero-phase-sequence voltage command value Vo* shown in (Expression 2).

In step S203a, if the voltage command value Varm* is greater than ΣVcap or smaller than 0 (step S4, Yes), the control device 50 determines to execute the adjustment control.

Such control in which the control device 50 determines whether or not to execute the adjustment control as described above is referred to as determination control.

In this case, as in steps S4 to S15 of embodiment 1, the control device 50 adjusts the zero-phase-sequence voltage command value Vo* on the basis of the arm voltage command value Varm* for the arm 10 of which the first deviation ΔVarm or the second deviation Varm* is smallest among the arms 10, i.e., the control allowance of the arm voltage command value Varm* with respect to the limit value of the output voltage range is smallest.

First, in step S4, if the first deviation ΔVarmpu or the second deviation Varmpu* of the u-phase positive-side arm 10uP is smallest among the first deviations ΔVarm and the second deviations Varm of the arms 10 for all the phases (step S4, Yes), the process proceeds to step S5, and the zero-phase-sequence voltage command value Vo* is adjusted by the above (Expression 23) or (Expression 24).

In step S6, if the first deviation ΔVarmnu or the second deviation Varmnu* of the u-phase negative-side arm is smallest among the first deviations ΔVarm and the second deviations Varm of the arms 10 for all the phases (step S6, Yes), the process proceeds to step S7, and the zero-phase-sequence voltage command value Vo* is adjusted by the above (Expression 25) or (Expression 26).

In step S8, if the first deviation ΔVarmpv or the second deviation Varmpv* of the v-phase positive-side arm is smallest among the first deviations ΔVarm and the second deviations Varm of the arms 10 for all the phases (step S8, Yes), the process proceeds to step S9, and the zero-phase-sequence voltage command value Vo* is adjusted by the above (Expression 27) or (Expression 28).

In addition, with reference to FIG. 18, in step S10, if the first deviation ΔVarmnv or the second deviation Varmnv* of the v-phase negative-side arm is smallest among the first deviations ΔVarm and the second deviations Varm of the arms 10 for all the phases (step S10, Yes), the process proceeds to step S11, and the zero-phase-sequence voltage command value Vo* is adjusted by the above (Expression 29) or (Expression 30).

In step S12, if the first deviation ΔVarmpw or the second deviation Varmpw of the w-phase positive-side arm is smallest among the first deviations ΔVarm and the second deviations Varm of the arms 10 for all the phases (step S12, Yes), the process proceeds to step S13, and the zero-phase-sequence voltage command value Vo* is adjusted by the above (Expression 31) or (Expression 32).

In step S14, if the first deviation ΔVarmnw or the second deviation Varmnw of the w-phase negative-side arm is smallest among the first deviations ΔVarm and the second deviations Varm of the arms 10 for all the phases (step S14, Yes), the process proceeds to step S15, and the zero-phase-sequence voltage command value Vo* is adjusted by the above (Expression 33) or (Expression 34).

The zero-phase-sequence voltage command value Vo* adjusted as described above is subtracted from the positive-side arm voltage command value Varmp and added to the negative-side arm voltage command value Varmn as shown in FIG. 5, and the resultant values are inputted to the positive-side arm modulation command generation unit 53p and the negative-side arm modulation command generation unit 53n.

As described above, the control device 50 of the present embodiment monitors whether or not the arm voltage command value Varm* goes outside of the limit value of the output voltage range of the arm 10, and performs determination control to execute adjustment control only when the arm voltage command value Varm* goes outside of the limit value. Thus, unnecessary current is prevented from flowing, whereby operation stability of the power converter 1 can be ensured.

In the above description, the example in which the control device 50 performs adjustment control only when the arm voltage command value Varm* goes outside of the limit value of the output voltage range, has been described. However, the adjustment control may be performed only when the control allowance is less than a set first threshold Vth. In the multilevel converter in which the converter cells 11 are connected in series in a multiplexed manner, noise on the output side can increase due to switching of the semiconductor switching elements 12. Accordingly, by providing the first threshold Vth as a margin for the control allowance, it becomes possible to perform control considering the influence of switching noise. Thus, operation stability of the power converter 1 can be further ensured.

If the first threshold Vth is set such that a value that is the first threshold Vth or less indicates that the arm voltage command value Varm* goes outside of the limit value of the output voltage range, determination for whether or not the arm voltage command value Varm goes outside the limit value of the output voltage range can be performed using the first threshold Vth.

In this case, for example, the first deviation ΔVarm is set to a value obtained by subtracting the arm voltage command value Varm* from the upper limit value ΣVcap of the limit value of the output voltage range, and the second deviation Varm* is set to a value obtained by subtracting the lower limit value 0 of the limit value from the arm voltage command value Varm*. Then, by setting the first threshold Vth to a value less than 0, determination for going outside of the limit value of the arm 10 can be performed using the first threshold Vth.

The control device 50 may perform the determination control during execution of the harmonic control in the second control, to determine whether or not the adjustment control needs to be executed.

In the power conversion device of the present embodiment configured as described above, the control unit performs determination control for determining whether or not to execute the adjustment control, using a sum of voltage values of all the energy storage elements in each arm as the limit value.

As described above, the control device performs the determination control for determining whether or not to execute the adjustment control, using the sum of the voltage values of all the energy storage elements. Thus, by performing control in such a manner that the adjustment control is performed only when the adjustment control is needed on the basis of the limit values of the output voltage range, operation stability of the power converter can be ensured.

In the power conversion device of the present embodiment configured as described above, in the determination control, the control unit determines to execute the adjustment control when the tolerance of at least one of the arm voltage command values has become a first threshold or less.

As described above, by providing the first threshold in determination for the adjustment control, it is possible to provide a margin considering the influence of switching noise for the limit values. Thus, operation stability of the power converter can be further ensured.

In the power conversion device of the present embodiment configured as described above, the first threshold is set such that a value that is the first threshold or less indicates that the arm voltage command value goes outside of the limit value.

In the power conversion device of the present embodiment configured as described above, the tolerance is a first deviation which is a difference obtained by subtracting the arm voltage command value from an upper limit value of the limit value, or a second deviation obtained by subtracting a lower limit value of the limit value from the arm voltage command value, and the first threshold is set to a value less than 0.

As described above, it is possible to determine whether the arm voltage command value goes outside of the limit value, using the first threshold. In addition, by changing the set value for the first setting value, a condition for executing the adjustment control can be easily changed and thus controllability of the power conversion device can be improved.

In the power conversion device of the present embodiment configured as described above, the control unit executes harmonic control for adjusting the zero-phase-sequence voltage command value so that the zero-phase-sequence voltage command value has a sinewave with a frequency represented by P×(2N−1), and performs the determination control during execution of the harmonic control. Here, P is a number of phases of the AC and N is an integer not less than 1.

As described above, the control unit executes the harmonic control in the second control, and during execution of the harmonic control, further determines whether or not the adjustment control needs to be executed. Thus, even while the harmonic control is performed, if the arm voltage command value goes outside of the limit value of the output voltage range, the adjustment control can be further executed, whereby operation stability of the power conversion device can be further ensured.

As described above, according to embodiment 2, only when overmodulation occurs due to a ground fault on a grid or the like, the zero-phase-sequence voltage is adjusted so that the voltage command values become equivalent to the limit values of the output voltage range of the converter. Thus, the voltage usage ratio can be maximally ensured, stop based on overcurrent due to voltage insufficiency or the like can be prevented, and unnecessary current is prevented from flowing, whereby operation continuity can be improved.

In addition, even in a case where the output voltage levels of the arms change due to a ground fault on the grid, the voltage usage ratio can be maximally used through the adjustment control, whereby switching loss can be significantly reduced. Thus, it becomes possible to immediately restore the output voltages of the arms to a desired voltage level.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 power converter
9, 9u, 9v, 9w leg circuit
10, 10uP, 10vP, 10wP, 10uN, 10vN, 10wN arm
12, 12U, 12L, 12U1, 12L1, 12U2, 12L2 semiconductor switching element (semiconductor element)
13 DC capacitor (energy storage element)
50 control device (control unit)
100 power conversion device

The invention claimed is:

1. A power conversion device comprising:
a power converter including, for respective phases of AC, leg circuits each including a pair of arms connected in series to each other, the arms each including a plurality of converter cells which are connected in series and each of which has an energy storage element and a plurality of semiconductor elements, the leg circuits being connected in parallel between positive and negative DC terminals, the power converter being configured to perform power conversion between AC and DC; and
a controlling circuitry for controlling the power converter, wherein
the controlling circuitry includes a command value correction circuitry which corrects an arm voltage command value for each arm for controlling outputs of the converter cells in the arm, by a zero-phase-sequence voltage command value, and
the command value correction circuitry performs adjustment control for adjusting the zero-phase-sequence voltage command value so that at least one of the arm voltage command values becomes equivalent to a limit value of an output voltage range of the arm,
wherein
the controlling circuitry performs, for the arm voltage command value of which a tolerance with respect to the limit value is smallest among a plurality of the arm voltage command values, the adjustment control for adjusting the zero-phase-sequence voltage command value by the command value correction circuitry using the tolerance of the arm voltage command value.

2. The power conversion device according to claim 1, wherein
in the adjustment control, the controlling circuitry adjusts the zero-phase-sequence voltage command value, using the tolerance for each control cycle of the arm voltage command value.

3. The power conversion device according to claim 2, wherein
each converter cell includes a series circuitry having semiconductor switching elements as the semiconductor elements in both of an upper arm and a lower arm, such that the series circuitry and the energy storage element are connected in parallel, and
in the adjustment control, for the arm to be controlled by the arm voltage command value adjusted so as to become equivalent to the limit value, the controlling circuitry performs control so that, of the semiconductor switching elements in the upper arm and the lower arm of each converter cell of the arm, either one is fixed in an ON state and another one is fixed in an OFF state.

4. The power conversion device according to claim 3, wherein
the tolerance is a first deviation which is a difference between the arm voltage command value and an upper limit value of the limit value, or a second deviation which is a difference between the arm voltage command value and a lower limit value of the limit value.

5. The power conversion device according to claim 3, wherein
the controlling circuitry performs determination control for determining whether or not to execute the adjustment control, using a sum of voltage values of all the energy storage elements in each arm as the limit value.

6. The power conversion device according to claim 2, wherein
the tolerance is a first deviation which is a difference between the arm voltage command value and an upper limit value of the limit value, or a second deviation which is a difference between the arm voltage command value and a lower limit value of the limit value.

7. The power conversion device according to claim 6, wherein
the controlling circuitry performs determination control for determining whether or not to execute the adjustment control, using a sum of voltage values of all the energy storage elements in each arm as the limit value.

8. The power conversion device according to claim 2, wherein
the controlling circuitry performs determination control for determining whether or not to execute the adjustment control, using a sum of voltage values of all the energy storage elements in each arm as the limit value.

9. The power conversion device according to claim 1, wherein
each converter cell includes a series circuitry having semiconductor switching elements as the semiconductor elements in both of an upper arm and a lower arm, such that the series circuitry and the energy storage element are connected in parallel, and
in the adjustment control, for the arm to be controlled by the arm voltage command value adjusted so as to become equivalent to the limit value, the controlling circuitry performs control so that, of the semiconductor switching elements in the upper arm and the lower arm of each converter cell of the arm, either one is fixed in an ON state and another one is fixed in an OFF state.

10. The power conversion device according to claim 9, wherein
the tolerance is a first deviation which is a difference between the arm voltage command value and an upper limit value of the limit value, or a second deviation which is a difference between the arm voltage command value and a lower limit value of the limit value.

11. The power conversion device according to claim 10, wherein
the controlling circuitry performs determination control for determining whether or not to execute the adjustment control, using a sum of voltage values of all the energy storage elements in each arm as the limit value.

12. The power conversion device according to claim 9, wherein
the controlling circuitry performs determination control for determining whether or not to execute the adjustment control, using a sum of voltage values of all the energy storage elements in each arm as the limit value.

13. The power conversion device according to claim 1, wherein
the tolerance is a first deviation which is a difference between the arm voltage command value and an upper limit value of the limit value, or a second deviation which is a difference between the arm voltage command value and a lower limit value of the limit value.

14. The power conversion device according to claim 13, wherein
the controlling circuitry performs determination control for determining whether or not to execute the adjustment control, using a sum of voltage values of all the energy storage elements in each arm as the limit value.

15. The power conversion device according to claim 1, wherein
the controlling circuitry performs determination control for determining whether or not to execute the adjustment control, using a sum of voltage values of all the energy storage elements in each arm as the limit value.

16. The power conversion device according to claim 15, wherein
in the determination control, the controlling circuitry determines to execute the adjustment control when the tolerance of at least one of the arm voltage command values has become a first threshold or less.

17. The power conversion device according to claim 16, wherein
the first threshold is set such that a value that is the first threshold or less indicates that the arm voltage command value goes outside of the limit value.

18. The power conversion device according to claim 17, wherein
the tolerance is a first deviation which is a difference obtained by subtracting the arm voltage command value from an upper limit value of the limit value, or a second deviation obtained by subtracting a lower limit value of the limit value from the arm voltage command value, and
the first threshold is set to a value less than 0.

19. The power conversion device according to claim 15, wherein
the controlling circuitry executes harmonic control for adjusting the zero-phase-sequence voltage command value so that the zero-phase-sequence voltage command value has a sinewave with a frequency represented by P×(2N−1), and performs the determination control during execution of the harmonic control,
where P is a number of phases of the AC and N is an integer not less than 1.

20. The power conversion device according to claim 1, wherein
the controlling circuitry executes the adjustment control during an entire operation period in which power conversion operation of the power converter is performed, and
at least one of the arm voltage command values is adjusted to be equivalent to the limit value, at each point of time during the operation period of the power converter.

* * * * *